United States Patent
Tanno

(10) Patent No.: US 6,374,298 B2
(45) Date of Patent: Apr. 16, 2002

(54) SYSTEM FOR PERFORMING REMOTE OPERATION BETWEEN FIREWALL-EQUIPPED NETWORKS OR DEVICES

(75) Inventor: Kazuhira Tanno, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/245,921

(22) Filed: Feb. 8, 1999

Related U.S. Application Data

(62) Division of application No. 08/614,060, filed on Mar. 12, 1996, now Pat. No. 5,960,177.

(30) Foreign Application Priority Data

May 19, 1995 (JP) .............................................. 7-121975

(51) Int. Cl.⁷ ............................ G06F 15/16; H04L 9/00
(52) U.S. Cl. ...................................... 709/227; 713/201
(58) Field of Search ............................ 709/225, 227, 709/228, 229, 249; 370/401, 402; 713/200, 201; 340/825.34

(56) References Cited

U.S. PATENT DOCUMENTS

| | | | |
|---|---|---|---|
| 5,481,720 A | | 1/1996 | Loucks et al. |
| 5,548,721 A | | 8/1996 | Denslow |
| 5,550,984 A | | 8/1996 | Gelb |
| 5,560,008 A | | 9/1996 | Johnson et al. |
| 5,586,260 A | | 12/1996 | Hu |
| 5,623,601 A | | 4/1997 | Vu |
| 5,649,187 A | | 7/1997 | Hornbuckle |
| 5,677,851 A | | 10/1997 | Kingdon et al. |
| 5,699,513 A | | 12/1997 | Feigen et al. |
| 5,802,320 A | * | 9/1998 | Baehr et al. ................. 709/249 |
| 5,864,683 A | * | 1/1999 | Boebert et al. ............. 709/249 |
| 5,960,177 A | * | 9/1999 | Tanno ....................... 709/229 |

FOREIGN PATENT DOCUMENTS

| | | |
|---|---|---|
| JP | 60-108950 | 6/1985 |
| JP | 62-234441 | 10/1987 |
| JP | 63-298551 | 12/1988 |
| JP | 2-306742 | 12/1990 |
| JP | 4-149657 | 5/1992 |
| JP | 4-370870 | 12/1992 |
| JP | 5-35622 | 2/1993 |
| JP | 6-12347 | 1/1994 |

OTHER PUBLICATIONS

Bellowin, "Network Firewalls", IEEE Communications Magazine (9/94).
Stempel, "An Internet Service Access System for Firewall Installations", IEEE (4/95).
Counterpart Japanese Office Action mailed Dec. 12, 2000 (pp. 1–5).
"HoneyDanBer UUCP(1)" UNIX Magazine, vol. 6, #8 1991, pp. 75–88.

* cited by examiner

Primary Examiner—Mark H. Rinehart
Assistant Examiner—Marc D. Thompson
(74) Attorney, Agent, or Firm—Staas & Halsey LLP

(57) ABSTRACT

A remote operation system is disclosed which is used with a network environment in which a unit that provides remote operation services through networks and a unit that receives the services are each safeguarded by a firewall (or "each equipped with a firewall for") from an external network. The remote operation service receiving unit sets up a connection A with the firewall installed on the remote operation service providing unit side and transmits security check information to that firewall. The firewall checks this security check information and then sets up a connection B with the remote operation service providing unit via its associated internal network when it is determined that the security check information has been sent from a contract user unit. Thereby, information used for remote operation can be transmitted between the two units over a logical path composed of the connections A and B.

7 Claims, 25 Drawing Sheets

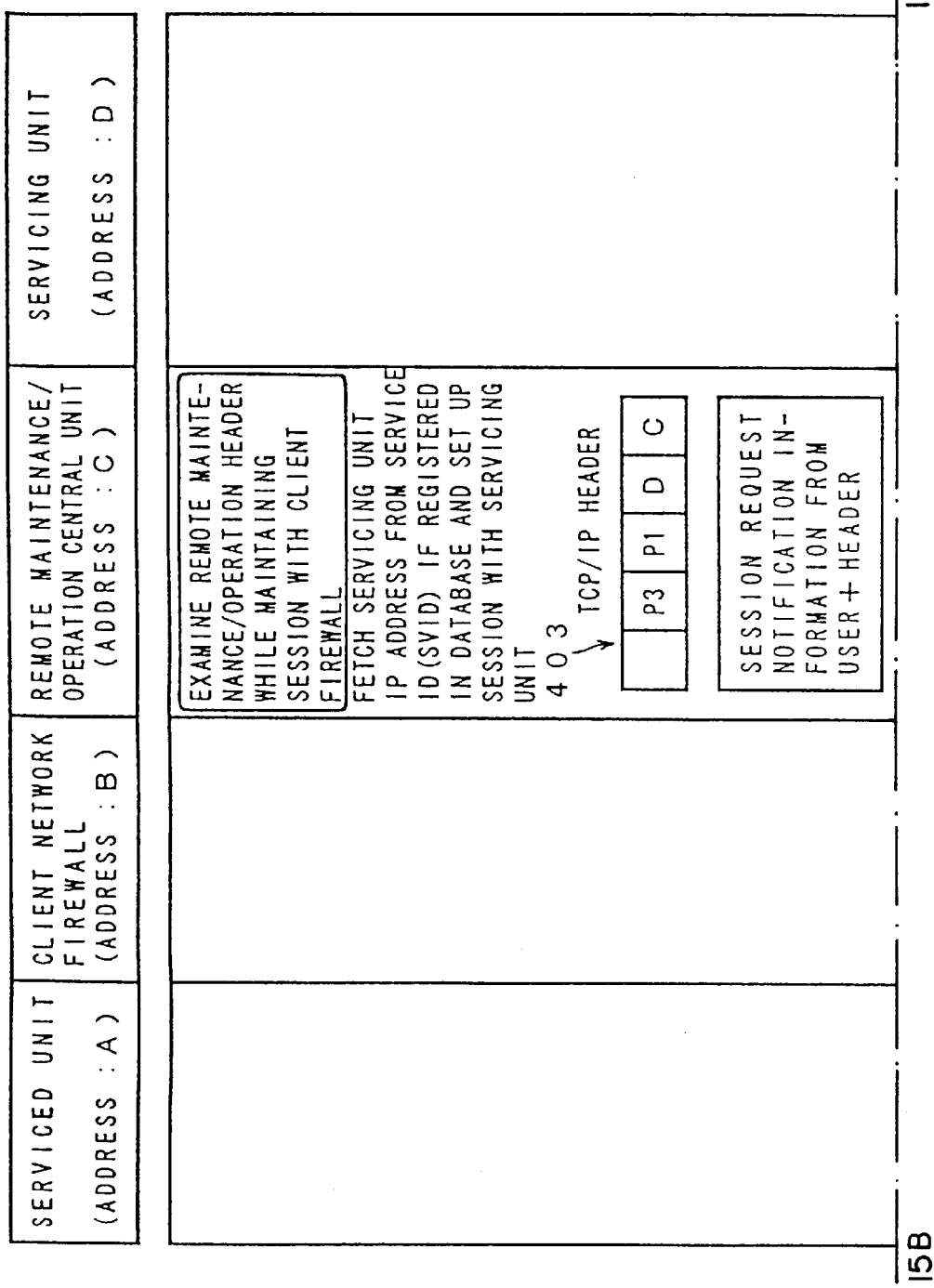

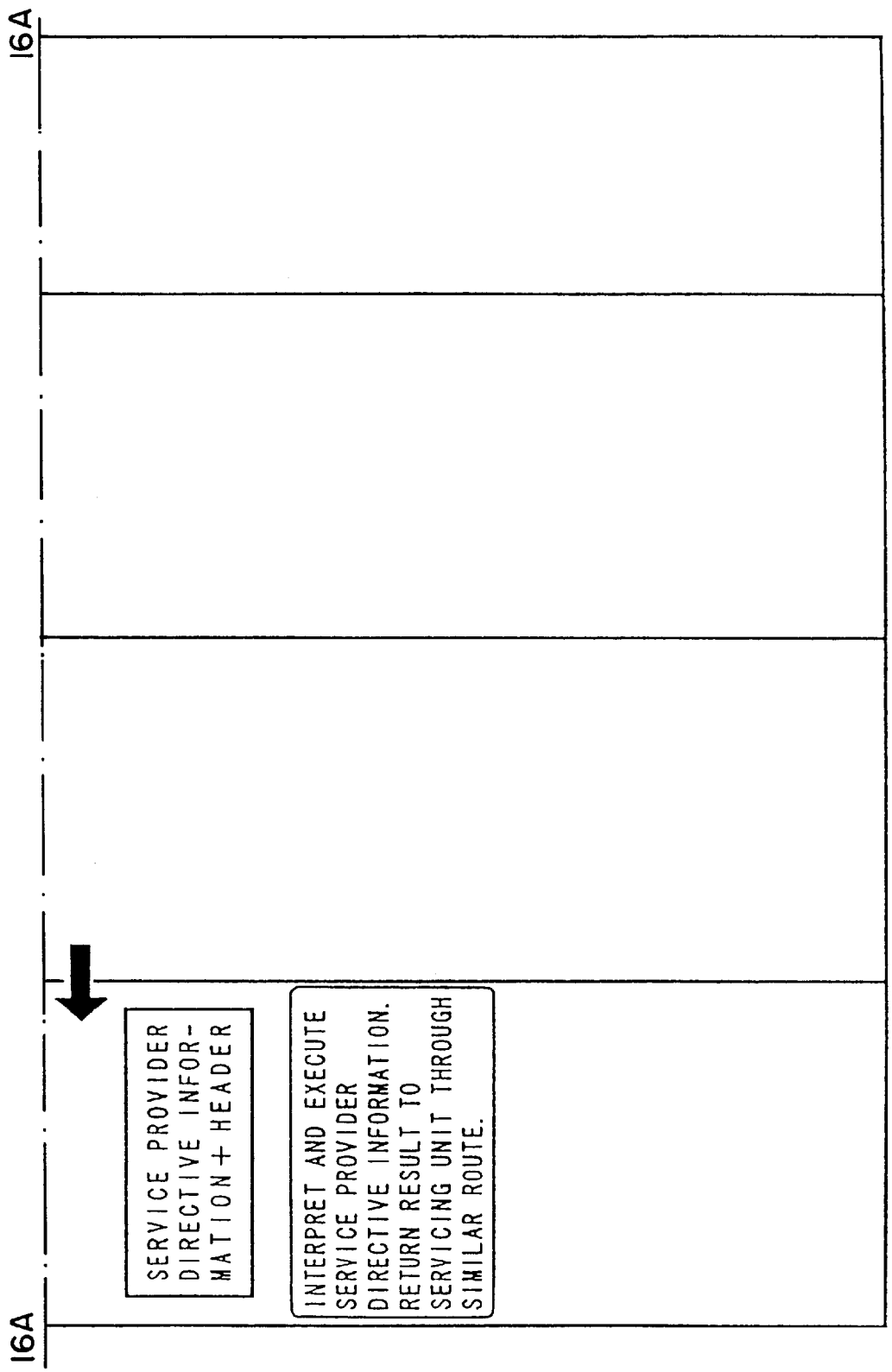

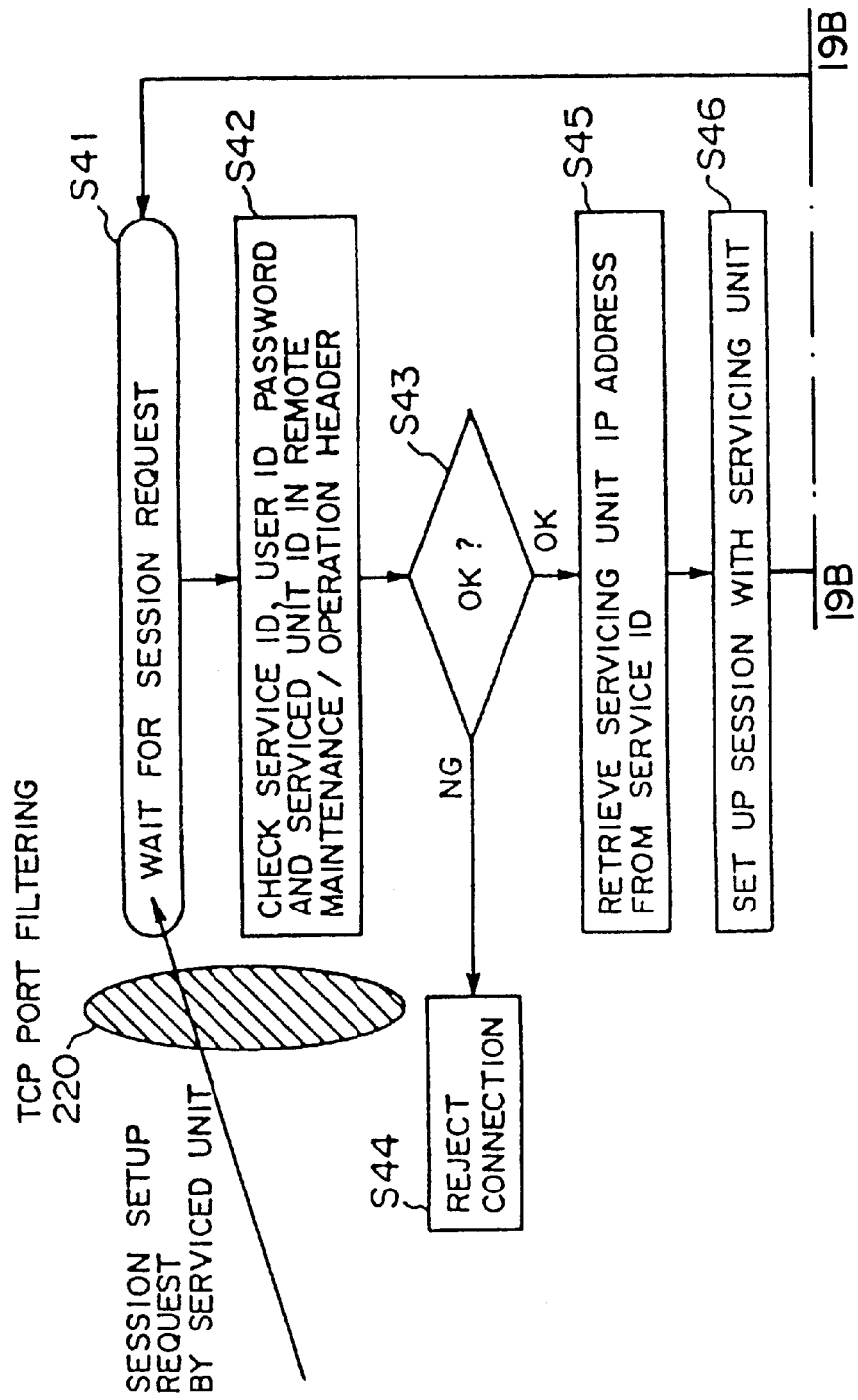

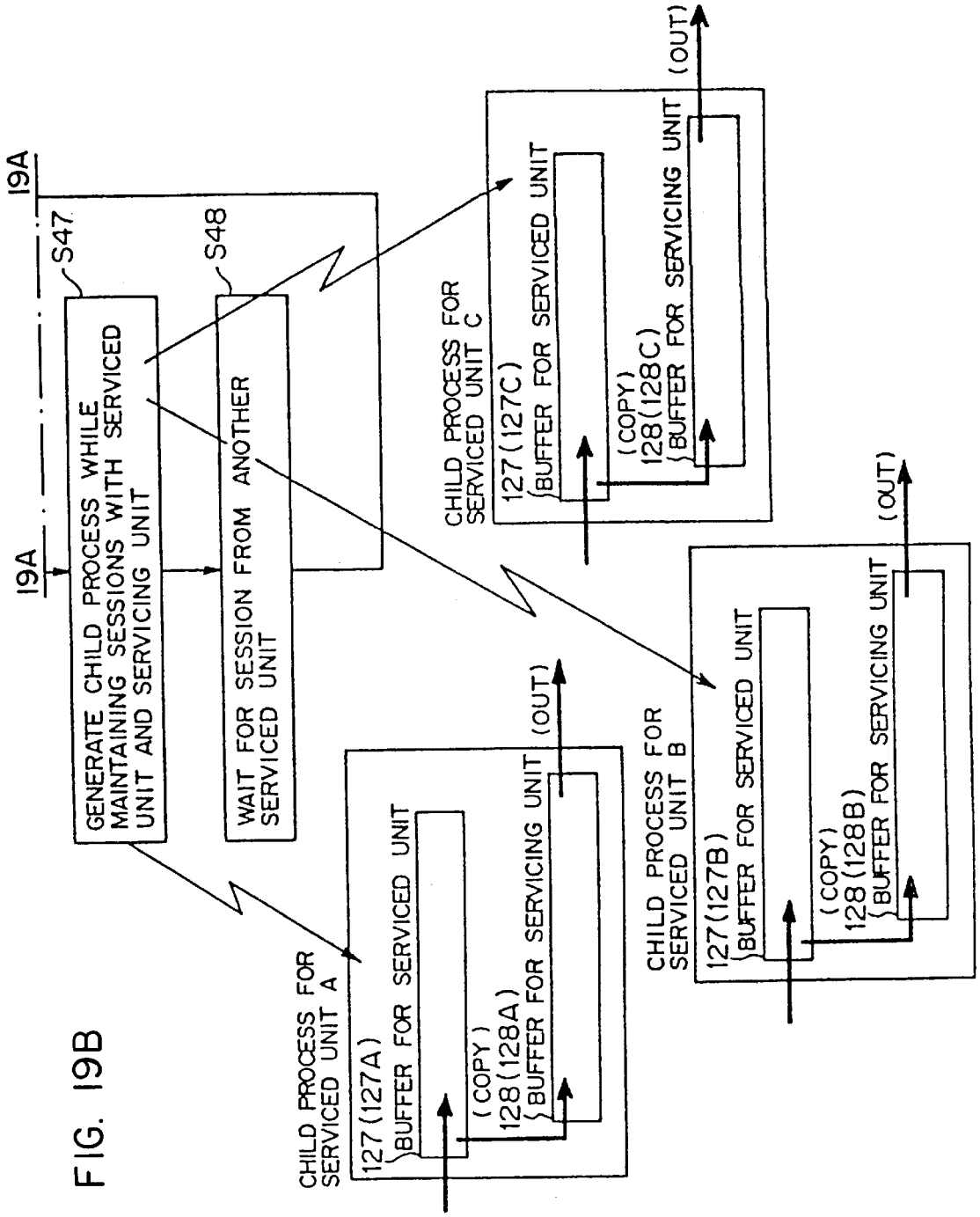

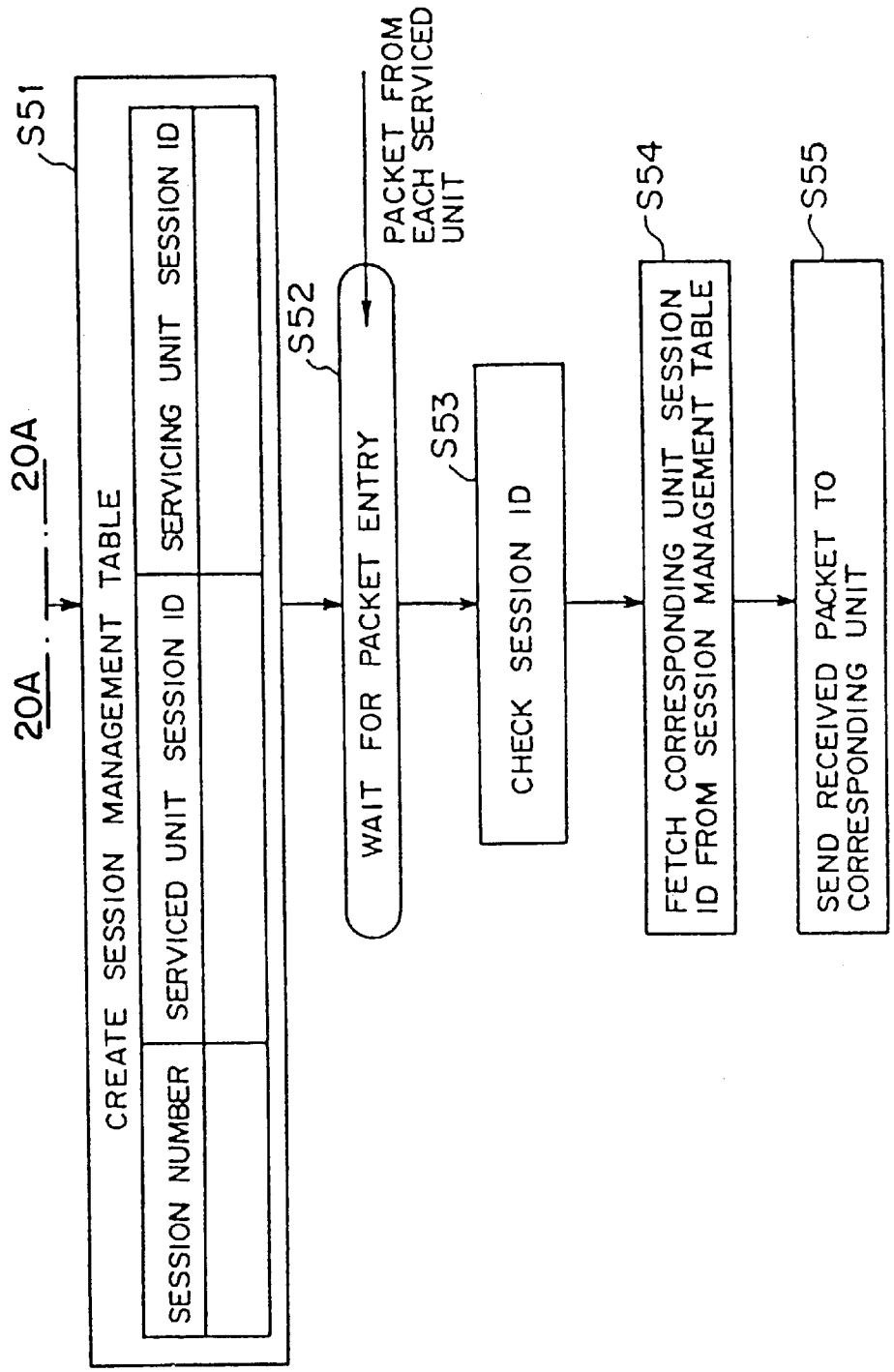

SYSTEM FOR PERFORMING REMOTE OPERATION BETWEEN FIREWALL-EQUIPPED NETWORKS OR DEVICES

This application is a division of Ser. No. 08/614,060 filed Mar. 12, 1996, U.S. Pat. No. 5,960,177.

BACKGROUND OF THE INVENTION

1. Field of the Invention

This invention relates to a remote maintenance and remote operation system in which a servicing device connected to an intracompany network of a service providing company performs maintenance and management on a device connected to a user-side network over an open external network, such as the Internet, through remote operation, and more specifically to a remote maintenance and remote operation system for use with network systems each of which is equipped with a firewall for the other.

2. Description of the Related Art

Nowadays a system is being practiced actively which performs maintenance and management on users' devices through remote operation over networks in order to save expenses and time for business trips.

Also, an attempt is being made to adopt a system which employs the Internet as a network for remote operation. The Internet is the worldwide network which permits free communications with unspecified persons around the world. Thus, the employment of the Internet will permit global remote maintenance service.

Incidentally, the Internet has a problem of security because it is an open network. In particular, if an intracompany network of a company is connected to the Internet and so all of host computers connected to that network are made accessible by outsiders over the Internet, then the company will be exposed to dangers that important internal information which must be kept confidential may be stolen, the system may be crashed, data may be altered, and the like.

For this reason, a "firewall" has come to be provided between the Internet and an intracompany network recently. The firewall is a facility for protecting the intracompany network from hackers. In general, firewalls are roughly classified into packet filtering gateways, circuit gateways, and application gateways.

FIG. 1 is a schematic illustration of a firewall that is equipped with the above-described packet filtering gateway feature and installed between an external network (Internet) 1 and an internal network (intracompany network) 2. In this figure there are illustrated IP address filtering and TCP port filtering by way of example.

Communications are made over the Internet on the basis on the TCP/IP protocol and IP datagram (IP packet) routing within the Internet is controlled on a bucket brigade basis. The IP datagram contains an IP header and a TCP header in its header.

The IP header contains an IP destination address (receiving IP address in the figure) and an IP source address (transmitting IP address in the figure). The IP address comprises a network address and a host address.

The-TCP header contains a receiving port number and a transmitting port number. The port numbers have a one-to-one correspondence with processes and are utilized for interprocess communications over the Internet. A firewall 3 is provided with an IP address table 32 and a port number table 34. Into the IP address table 32 is entered a set of IP addresses that is acceptable to the internal network 2. Also, into the port number table 34 is entered a set of port numbers that is acceptable to the internal network 2.

In the IP address filtering, when a packet is received, a reference is made to the IP address table 32. If a transmitting IP address that has not been entered into that table is placed in the IP header of that packet (IP datagram), the IP datagram is rejected. Also, in the TCP port filtering, a reference is made to the port number table 34 when an IP datagram (packet) is received. If a port number that has not been stored into the port number table 34 is placed in the TCP header of that IP datagram, it is rejected. In this way, specific applications, such as Telnet, FTP and the like, can be filtered.

FIG. 2 is a diagram for use in explanation of a second feature of the firewall 3.

The firewall 3 is provided with a feature of making access to hosts within the internal network 2 for hosts on the external network 1 (e.g., the Internet) in order not to allow the external hosts to make direct access to the hosts within the internal network 2. In other words, access by hosts within the internal network 2 to the external network is to be made through the firewall 3 all the time.

In the example shown in FIG. 2, an IP address of "E" is set up on the firewall 3. Also, "A", "B", "C" and "D" are set up on hosts A, B, C and D in the internal network 2 as their respective IP addresses. In such a system, for example, when the host B wants to transmit an IP datagram 12 to some host (external host) on the external network 1, the host B transmits the datagram 12 to the firewall 3 not to the external host directly. Since the IP address set up on the host B is "B" as described above, the transmitting IP address of the IP datagram 12 is "B". Upon receipt of the IP datagram 12, the firewall 3 translates the original transmitting IP address B to its IP address "E" for subsequent transmission over the external network.

Thus, if only the IP address of the firewall 3 is made open to the external network 1, the existence of the internal network will be kept from the external network. The feature is also called the IP relay feature.

By installing the firewall 3 equipped with such a packet filtering gateway feature as described above between the internal network 2 and the external network 1, improper IP datagrams that are going to enter the internal network 2 directly from the external network 1 can be blocked almost completely.

FIG. 3 shows a system in which internal networks 2A, 2B, 2C and 2D of respective A, B, C and D companies are connected with a commercial network 5. In this system, each of the A, B, C and D companies installs a respective one of firewalls 3A, 3B, 3C and 3D between its own internal network 2A, 2B, 2C, and 2D and the commercial internet 5 in order to protect their respective internal networks from unauthorized access via the commercial network 5.

Next, problems with such a system as shown in FIG. 3 will be described with reference to FIG. 4.

In FIG. 4, the A company is a company which provides maintenance and management services for pieces of software and hardware within a network that its client manages. Suppose that the client is the D company and the A company considers performing. maintenance and management services for a serviced device 7 connected to the D company's network 2D using a servicing device 6 connected to its own network by means of remote operation over the commercial internet 5.

In this case, when the IP address of the A company's firewall 3A has not been entered into the IP address table 32 in the D company's firewall 3D, even if the servicing device 6 transmits a packet for remote operation to the serviced device 7 of the D company, that packet is rejected by the firewall 3D and cannot enter the D company's internal network 2D. Thus, the A company cannot provides maintenance and management services for the serviced device of the D company.

If, on the other hand, the IP address of the A company's firewall 3A is entered into the IP address table 32 of the b company's firewall 3D, then the A company's servicing device 6 will be able to perform maintenance and management on the D company's serviced device 7 by remote operation. However, this will result in a problem of security. That is, in this case, since any host connected to the A company's internal network 2A, even it be a host other than the servicing device 6, can enter the D company's internal network, the possibility exists that the internal network 2D system of the D company may be destroyed and important information may be stolen. The reason is that the D company's firewall 3D cannot identify the source of packets sent from the A company's firewall 3A over the commercial internet 5.

In the prior art, therefore, as shown schematically in FIG. 5, direct point-to-point connection is made by a public line 8 or private line between the A company's servicing device 6 and the D company's serviced device 7 for maintenance and management service for the latter. With such an approach, however, it is required that both the A and D companies prepare communications devices 9A and 9B dedicated to the direct point-to-point connection therebetween and a servicing environment. Undesirably this involves double investment by both the companies, resulting in an increase in cost. In addition, in order to protect intracompany network security, it is necessary to carry out troublesome work of disconnecting each of the servicing device 6 and the serviced device 7 from its associated intracompany network 2A, 2B at the start of service and connecting them again at the termination of service.

SUMMARY OF THE INVENTION

It is an object of the invention to enable remote operation between devices each of which is connected to its associated internal network equipped with a firewall.

The present invention is directed to a system which is provided with a servicing unit connected to a first internal network in which a first firewall is installed for an external network and a serviced unit connected to a second internal network in which a second firewall is installed for the external network and wherein the servicing unit performs a remote operation on the serviced unit through the external network. In such a system, the serviced unit comprises: packet communications means for transmitting an identifier specifying the address of the servicing unit connected to the first internal network, setting up a connection with the servicing unit via the second firewall and the first firewall, and transmitting packets to or from the servicing unit over the connection; and remote operation execution means for fetching remote operation directive information from packets received by the packet communications means and performing a remote operation on the serviced unit as indicated by the remote operation directive information.

The serviced unit becomes able to transmit and receive packets used for remote operation to or from the servicing unit by first sending the identifier to the firewall on the servicing unit side and then setting up the connection with the servicing unit. Thus, the serviced unit can receive packets containing remote operation directive information from the servicing unit and perform an operation on itself as indicated by that directive information, thereby performing a remote operation.

BRIEF DESCRIPTION OF THE DRAWINGS

FIGS. 15A and 15B is a second diagram illustrating the contents of a packet communicated between the servicing unit and the client's serviced device when the servicing unit performs remote maintenance/operation on the serviced unit in the system of FIG. 12;

FIGS. 16A and 16B is a third diagram illustrating the contents of a packet communicated between the servicing unit and the client's serviced device when the servicing unit performs remote maintenance/operation on the serviced unit in the system of FIG. 12;

FIGS. 19A and 19B is an operating flowchart illustrating a process of relaying a packet (IP datagram) between the serviced unit and the servicing unit by the remote maintenance/operation central unit; and FIGS. 20A and 20B is an operating flowchart illustrating the IP relay feature of the remote maintenance/operation central unit illustrated in the operating flowchart of FIG. 19 from a different point of view.

DESCRIPTION OF THE PREFERRED EMBODIMENTS

Figure 1:
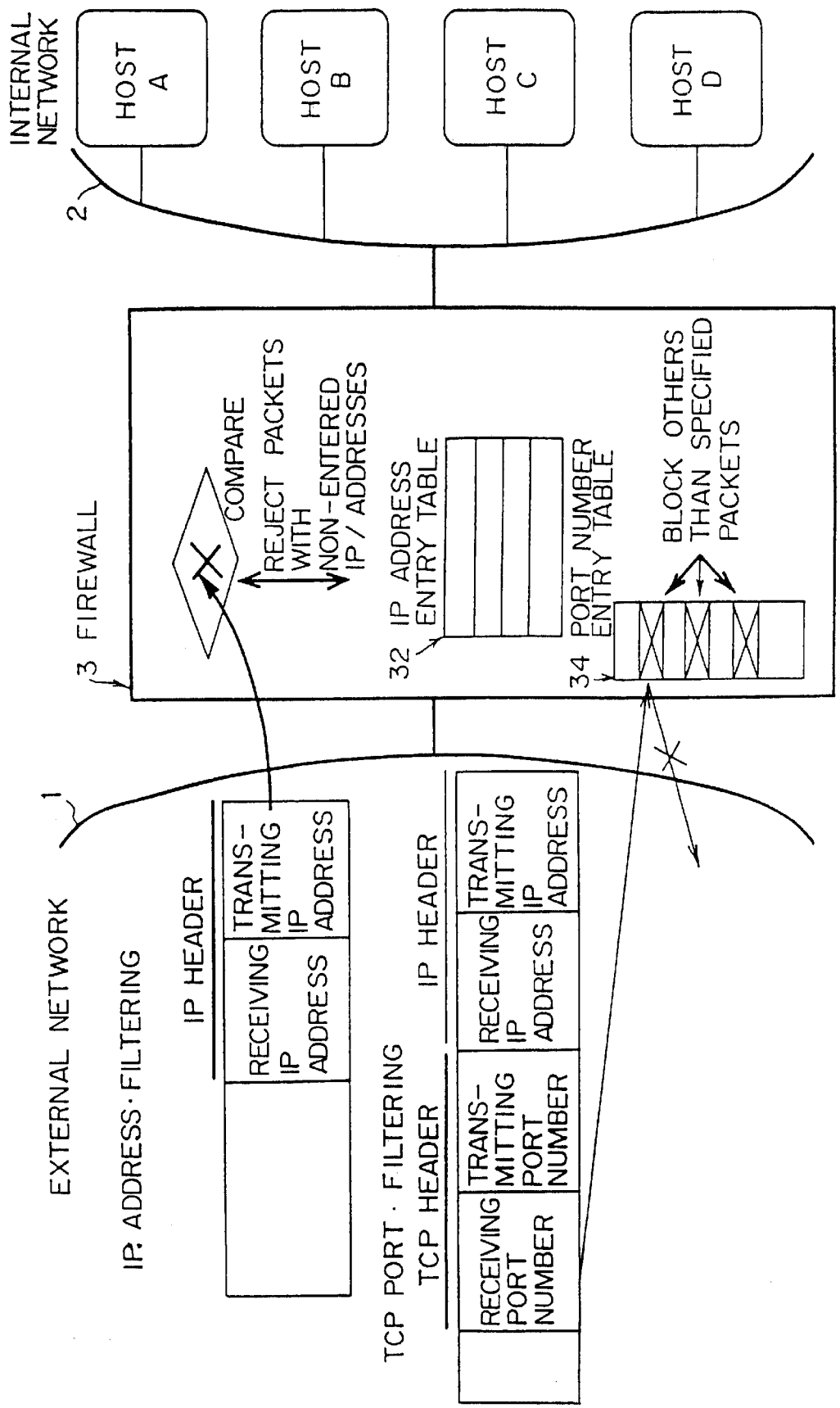
FIG. 1 is a diagram for use in explanation of the packet filtering gateway feature of a firewall.
Figure 2:
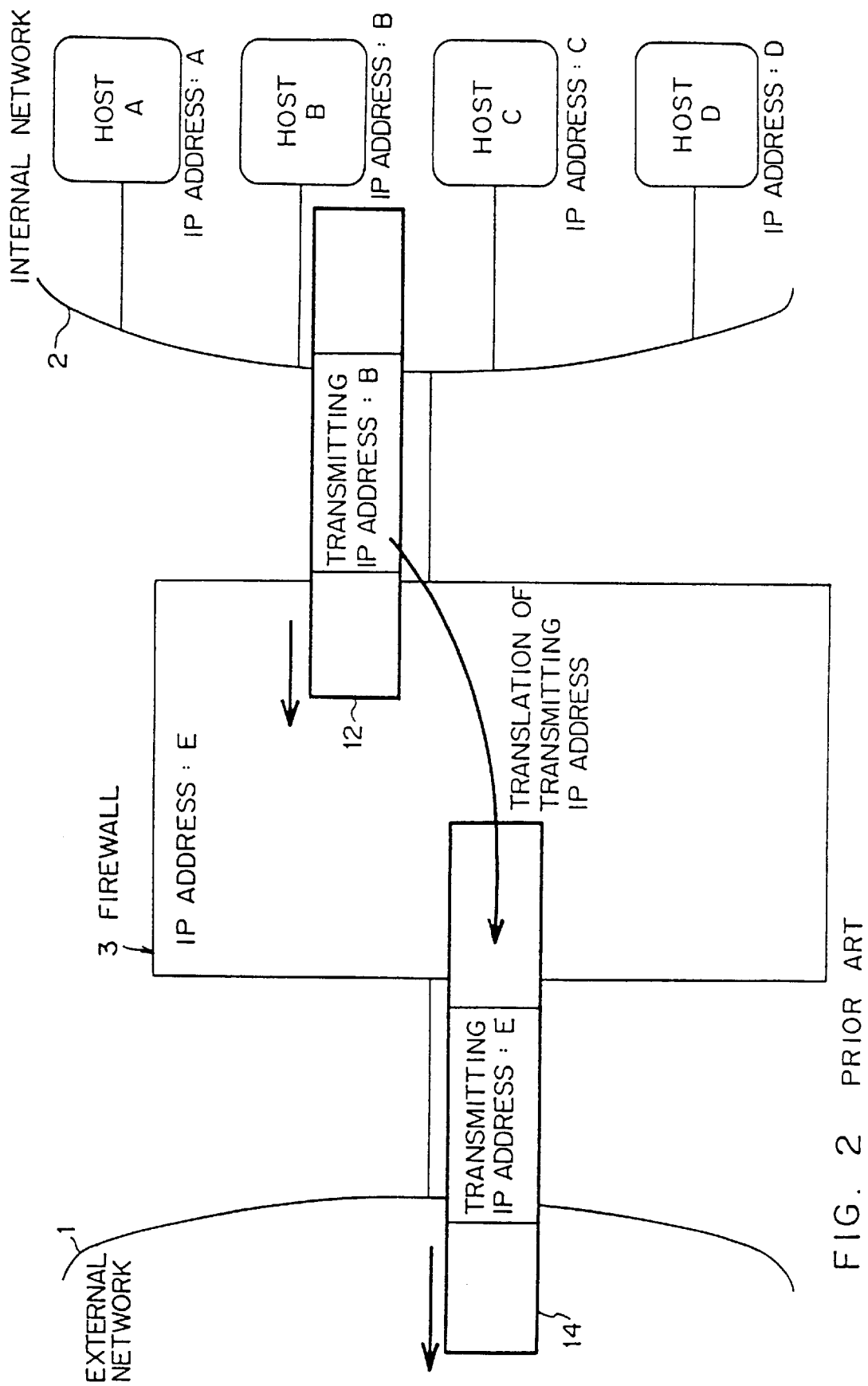
FIG. 2 is a diagram for use in explanation of the IP address translation/relay feature which is a second feature of the firewall.
Figure 3:
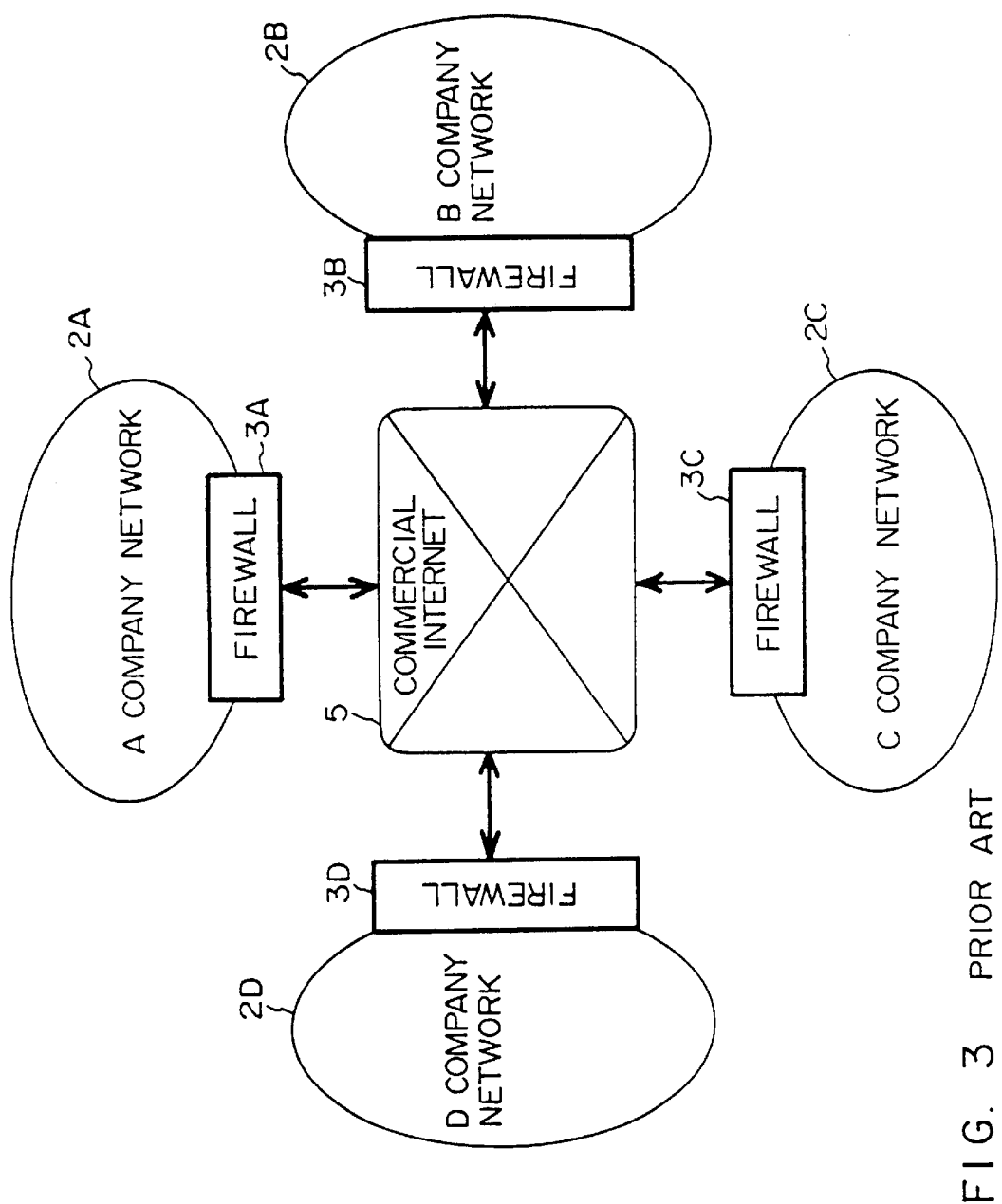
FIG. 3 shows a system in which each of internal networks of A, B, C and D companies is connected by a firewall to a commercial internet.
Figure 4:
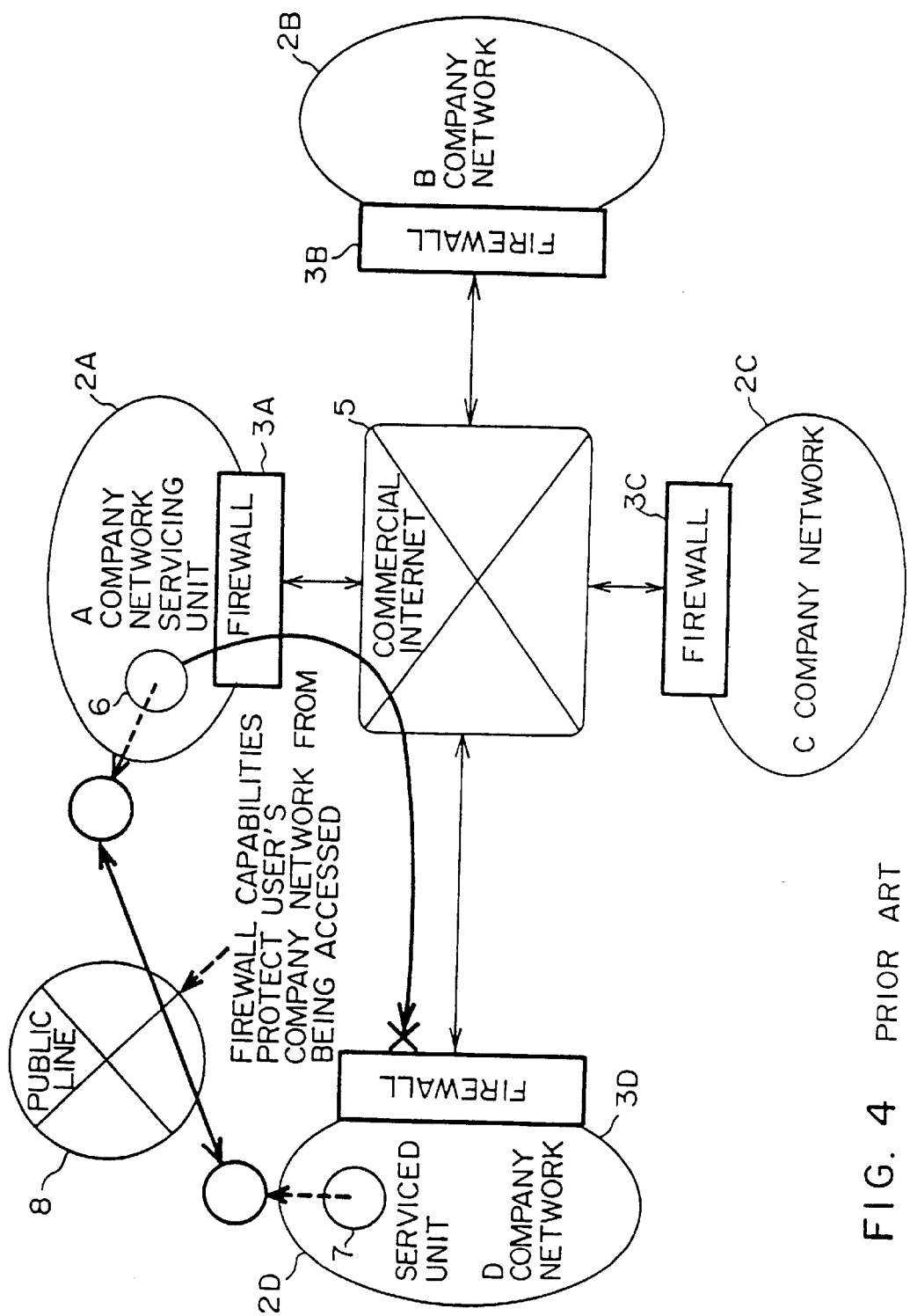
FIG. 4 is a diagram for use in explanation of the reason why, in the system of FIG. 3, a servicing unit connected to the internal network of the A company cannot perform remote maintenance/operation on a serviced unit connected to the internal network of the D company.
Figure 5:
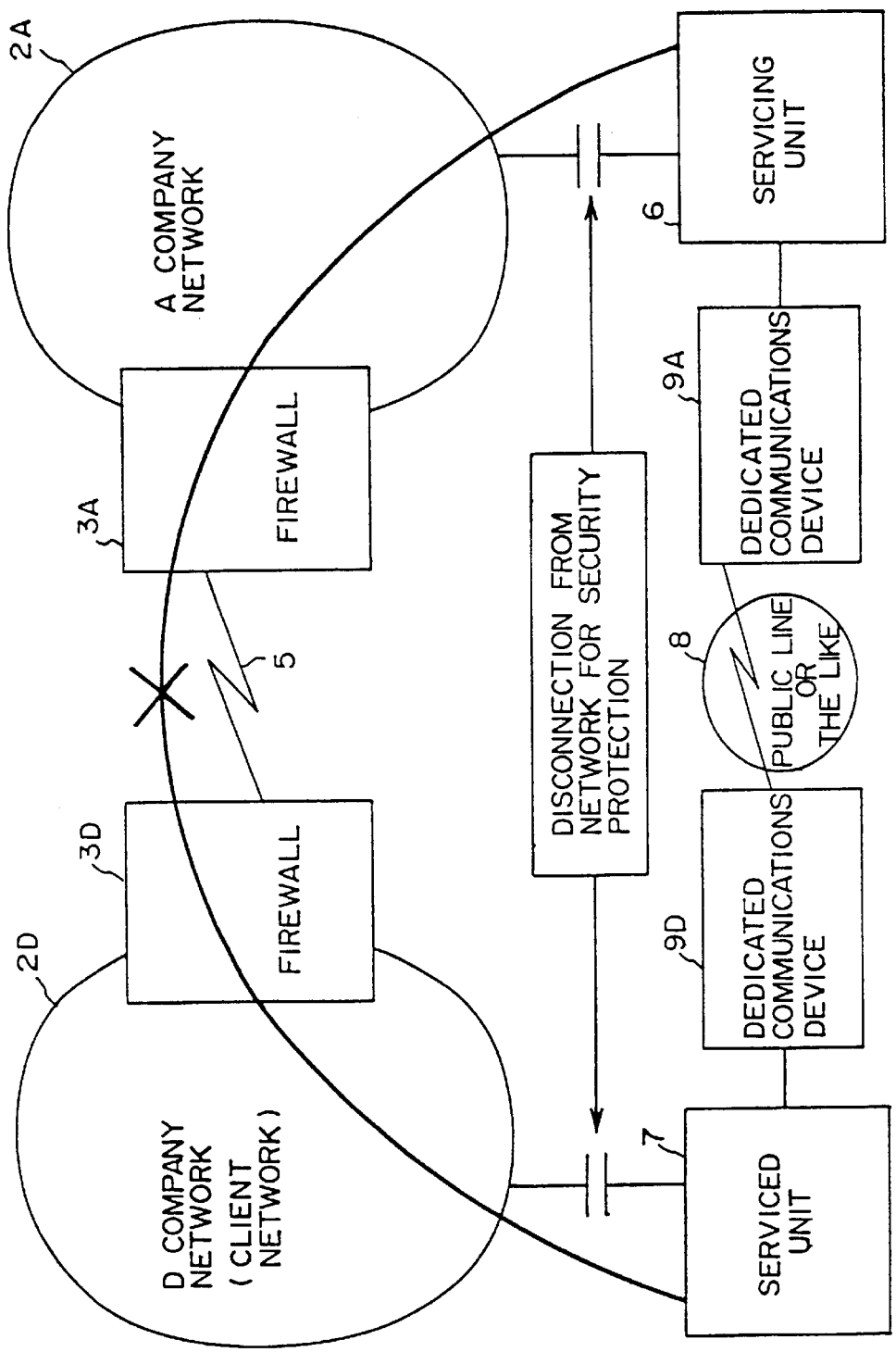
FIG. 5 is a diagram for use in explanation of a prior art method by which, in the system of FIG. 3, the servicing unit connected to the internal network of the A company performs remote maintenance/operation on a serviced unit connected to the internal network of the D company.
Figure 6:
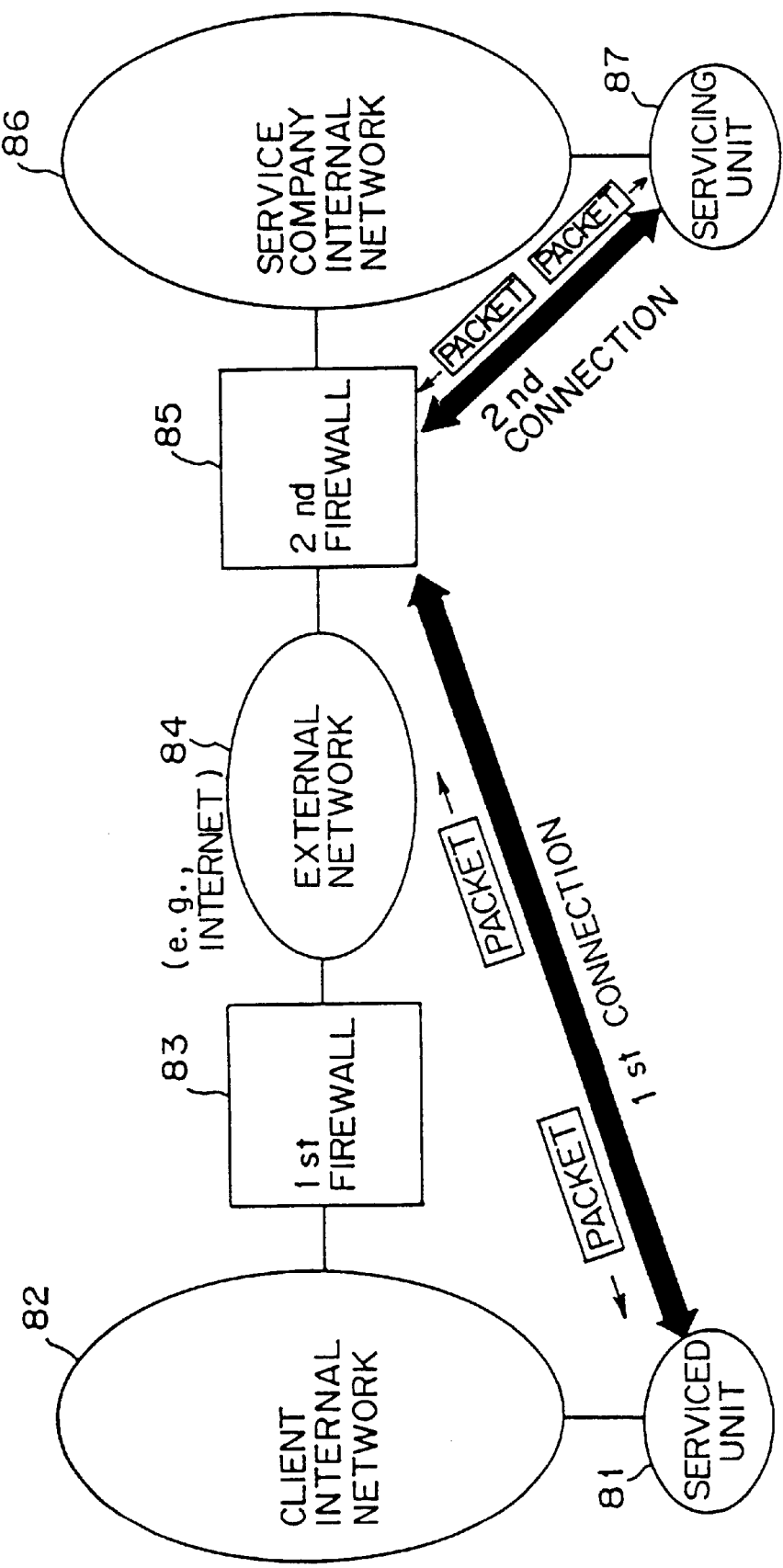
FIG. 6 is a first diagram for use in explanation of the principles of the present invention.

Referring now to FIG. 6, which is a first diagram illustrating the principles of the present invention, a client's internal network 82 is connected by an external network 84 with a remote operation service providing company's internal network 86. Firewalls 83 and 85 are respectively installed in the internal networks 82 and 86 for the external network 84. An embodiment of the present invention supposes a remote operation service system in which a remote operation service is provided to a serviced unit 81 connected to the client internal network 82 by a servicing unit 87 connected to the remote operation providing company's internal network 86.

The serviced unit 81 sets up a first connection with the second firewall 85 associated with the remote operation service providing company's internal network 86 via the client network 82 and the first firewall 83 associated with the network 82 and then communicates packets containing data for remote operation with the servicing unit 87 connected to the service company's internal network 86.

The second firewall 85 sets up a second connection with the servicing unit 87 via its associated internal network 86 after the first connection with the serviced unit 81 has been set up and then relays packets to be transmitted between the serviced unit 81 and the servicing unit 87 using the first and second connections.

The servicing unit 87 transmits packets to be transmitted to or from the serviced unit 81 to or from the second firewall 85 over the second connection to thereby provide a remote operation service for the serviced unit 81.

It should be noted here that the above-described first and second connections indicate logical paths, not private lines.

The second firewall 85 is equipped with a validation section for validating whether or not the serviced unit 81 belongs to a user under contract on the basis of the contents of data in packets transmitted from the serviced unit 81 over the first connection.

The serviced unit 81 is equipped with a validation section which, at the time of receipt of a packet produced by the servicing unit 87 and transferred from the second firewall 85 over the first connection, validates whether a remote operation executing command stored in that packet is valid or not.

The above-described external network is the Internet by way of example.

Figure 7:
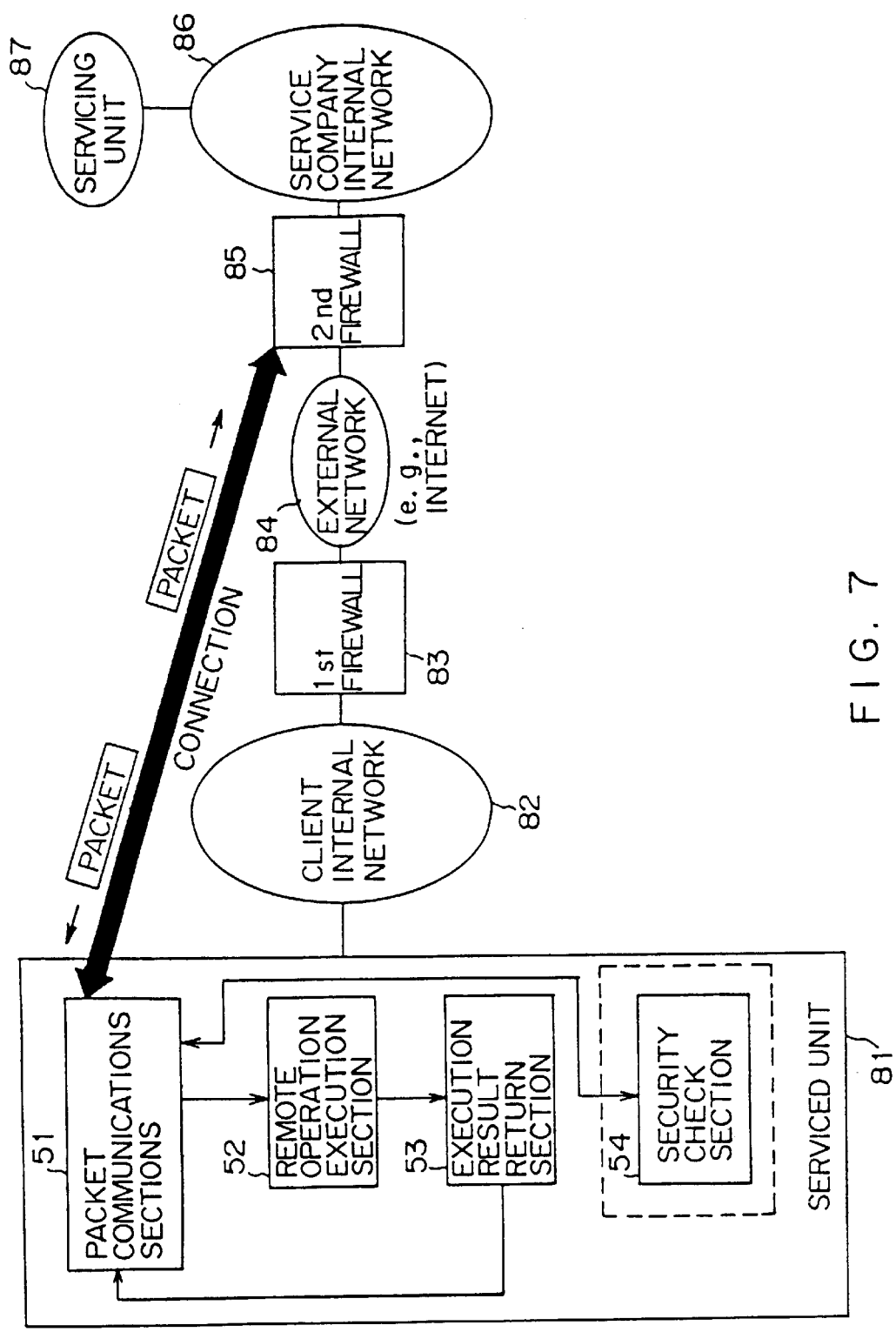
FIG. 7 is a second diagram for use in explanation of the principles of the present invention.

FIG. 7 is a second diagram illustrating the principles of the present invention.

In the figure, the serviced unit 81 is illustrated equipped with a packet communications section 51, a remote operation execution section 52, an execution result return section 53, and a security check section 54.

The packet communications section 51 transmits an identifier specifying the address of the servicing unit 87 connected to the internal network 86 to the second firewall 85, sets up a connection with the servicing unit 87 via the first and second firewalls 83 and 85, and transmits packets to or from the servicing unit 87 over that connection.

The execution result return unit 53 returns the results of execution of remote operation by the remote operation execution section 52 to the second firewall 85 via the packet communications section.

The security check section 54 checks the validity of a remote operation command contained in a packet received by the packet communications section 51.

In this case, .the remote operation execution section 52 carries out remote operation on the serviced unit in accordance with the remote operation command after its validity has been confirmed by the security check section 54.

Figure 8:
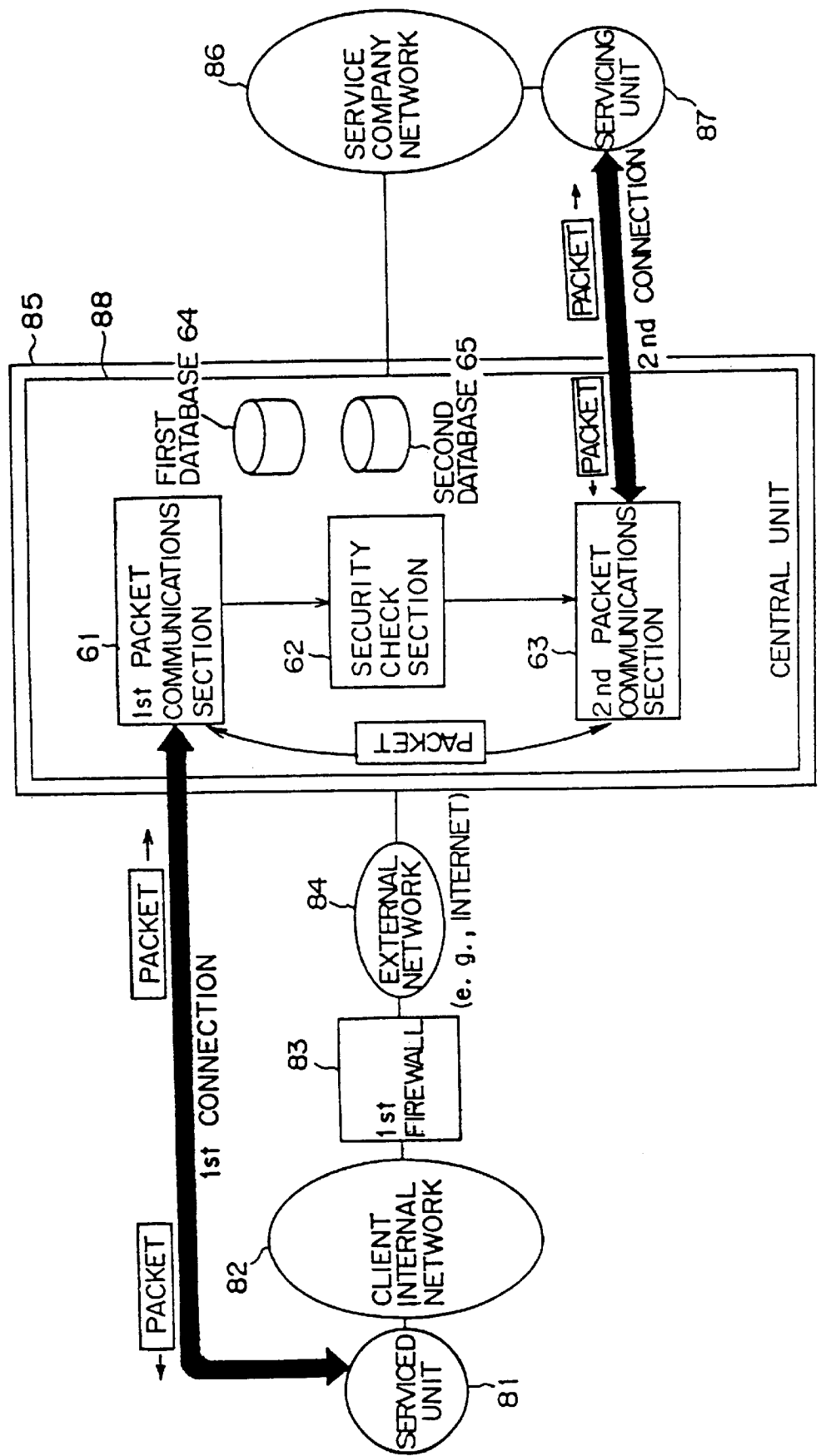
FIG. 8 is a third diagram for use in explanation of the principles of the present invention.

FIG. 8 is a third diagram for use in explanation of the principles of the invention.

In this figure, a central unit 88 functions as the second firewall 85 for the external network 84 of the internal network 86 of the company which provides remote operation service via the external network 84 for the serviced unit 81 connected to the contract user's internal network 82 in which the first firewall 83 is installed against the external network 84.

The central unit 88 is equipped with a first packet communications section 61, a security check unit 62, and a second packet communications section 63.

The first packet communications unit 61 sets up a first connection with the serviced unit 81 via the first firewall 83 and the external network 84 and transmits packets to or from the serviced unit 81 over the first connection.

The security check unit 62 checks packets received by the first communications unit 61 after the first connection has been set up to ensure that they have been sent from the serviced unit 81 of the user under contract.

The second communications section 63 sets up a second connection with the servicing unit 87 via its associated internal network 86 when the security check section 62 determined that the packets had been sent from the serviced unit 81 of the user under contract and then transmits packets to or from the servicing unit 87 over the second connection.

Moreover, the central unit 88 is equipped with a first database 64 into which validation information for the user under contract has been entered. The security check section 62 checks received packets for the presence of the validation information entered into the database 64, thereby determining whether they are from the user under contract.

Furthermore, the central unit 88 is equipped with a second database 65 into which servicing unit identification information used to set up the second connection has been entered. The second packet communications section 63 may be configured to retrieve servicing unit identification information corresponding to service identification information stored in packets received by the first packet communications section 61 from the second database 65 and set up the second connection using the servicing unit identification information.

Figure 9:
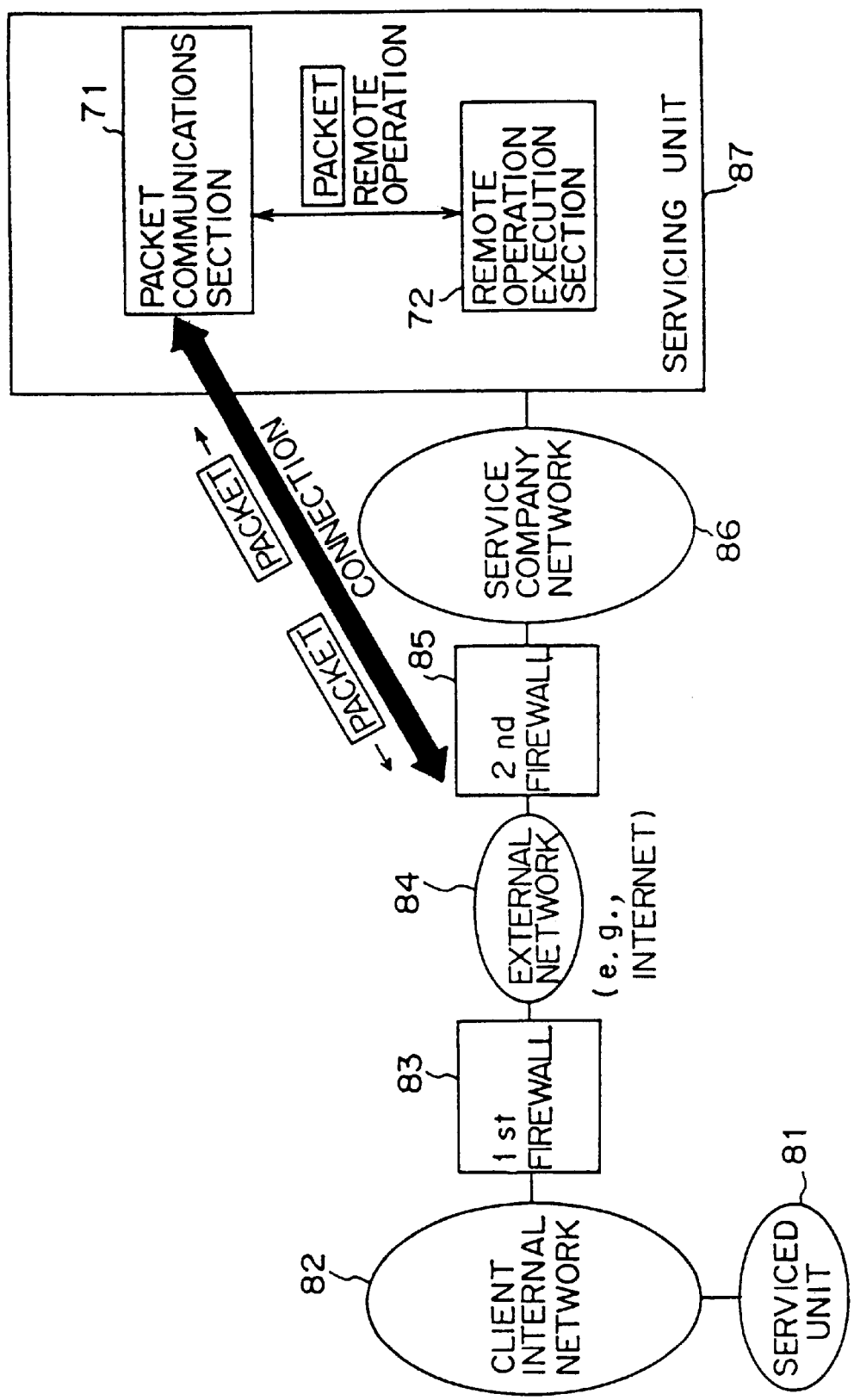
FIG. 9 is a fourth diagram for use in explanation of the principles of the present invention.

FIG. 9 is a fourth diagram illustrating the principles of the invention.

As shown in this figure, the servicing unit 87 is equipped with a packet communications section 71 and a remote operation execution section 72.

The packet communications section 71 sets up a connection with the second firewall 85 and then transmits packets to or from the serviced unit 81 over that connection.

The remote operation execution section 72 produces a packet in which a command is set up to perform a remote operation, which is specified by remote operation instructing information stored in packets received by the packet communications section 71, on the serviced unit and transmits it to the second firewall 85 via the packet communications section.

The remote operation execution section 72 obtains the result of execution of an remote operation that the serviced unit 81 placed from packets received by the packet communications section and outputs it to the outside.

Hereinafter, the operation of the system shown in FIGS. 6 to 9 will be described.

The serviced unit 81 sets up a first connection with the second firewall 85 installed for the remote operation servicing company's internal network 86 via the client network 82, the first firewall 83 and the external network 84 and then transmits packets containing data for remote operation to or from the servicing unit 87 connected to the servicing company's internal network 86 over the-first connection.

The second firewall 85 sets up a second connection with the servicing unit 87 via its associated internal network 86 after the first connection has been set up and relays packets to be transmitted between the serviced unit 81 and the servicing unit 87 by the use of the first and second connections.

The servicing unit 87 performs remote operation service on the serviced unit 81 by transmitting packets that are to be transmitted to or from the serviced unit 81 to or from the second firewall 85 over the second connection.

For example, in this case, after the first connection has been set up, the second firewall 85 determines, through its validation section, whether the serviced unit 81 belongs to the user under contract or not on the basis of the contents of data placed in packets transmitted from the serviced unit 81 over the first connection.

Also, when receiving a packet from the servicing unit 87 through the second firewall 85 and the first connection, the serviced unit 81 determines whether a remote operation executing command stored in that packet is a valid command or not through its validation section.

Thus, in a system in which first and second firewalls are respectively installed in a client internal network 82 and a remote operation servicing company's internal network 86 for an external network 84 to which each of the internal networks is connected, a servicing unit 87 on the servicing company internal network can perform remote operation service on a serviced unit 81 on the client internal network through the external network with security for the customer and servicing company internal networks being kept.

The packet communications section 51 transmits an identifier which allows the second firewall 85 to specify the address of the servicing unit 87 connected to the internal network 86, sets up a connection with the servicing unit 87 through the first and second firewalls 83 and 85, and transmits packets to or from the servicing unit 87 over that connection. The remote operation execution section 52 fetches remote operation command information from a packet received by the packet communications section 51 and then performs remote operation as specified by the remote operation command information.

Thus, in a system in which firewalls are respectively installed in a remote operation service providing company's internal network 86 and a client internal network 82 for an external network 84 to which each of the internal networks is connected, a serviced unit 81on the client network can transmit packets to the service providing company's internal network 86 and receive packets from a servicing unit 87 on the service providing company's internal network 86.

The security check section 54 checks the remote operation instruction information placed in packets received by the packet communications section 51 for validity., The,remote operation execution section 52 then performs a remote operation according to the contents of the remote operation directive information the validity of which has been confirmed by the security check section 54. The execution result return section 53 then sends the results of the remote operation executed by the remote operation execution section 52 to the second firewall 85 through the packet communications section.

Therefore, the serviced unit 81 can receive remote operation service while keeping its security and the servicing unit 87 can acquire the results of a remote operation performed on the serviced unit 81 through the second firewall 85.

The first packet communications section 61 sets up a first connection with the serviced unit 81 through the first firewall 83 and the external network 84 and then transmits packets to or from the serviced unit 81 over the first connection. The security check section 62 checks whether or not the packets received by the first packet communications section 61 after the first connection has been set up are packets transmitted from the serviced unit 81 of the user under contract. When it is determined by the securing check section 62 that the packets received by the first packet communications section 61 are packets transmitted from the serviced unit 81 of the user under contract, then the second packet communications section 63 sets up a second connection with the servicing unit 87 through its associated internal network 86 and then transmits packets to or from the servicing unit 87 over the second connection.

Therefore, packets can be transmitted to or from the serviced unit 81 connected to the client internal network 82 in which the first firewall 83 is installed. In addition, a security check can be performed on received packets to reject improper packets only packets sent from the serviced unit 81 of a user under contract can be transmitted to the servicing unit 87. Furthermore, packets can be transmitted from the servicing unit 87 to the serviced unit 81.

The packet communications section 71 sets up a connection with the second firewall 85 and then transmits packets to or from the serviced unit 81 over that connection. The remote operation execution section 72 produces a packet in which a command is placed to perform on the serviced unit 81 a remote operation specified by remote operation request information stored in packets received by the packet communications section 71 and then transmits it to the second firewall 85 through the packet communications section 71. Moreover, the remote operation execution section 72 fetches the result of execution of the remote operation set by the serviced unit 81 from packets received by the packet communications section 71 and provides it to the outside.

Therefore, the servicing unit 87 on the service providing company's internal network 86 can transmit packets to or from the second firewall 85 installed for the external network 84. This allows the servicing unit 87 to transmit packets for remote operation service to or from the serviced unit 81 when the second firewall 85 sets up a connection with the serviced unit 81 on the user internal network 82.

Figure 10:
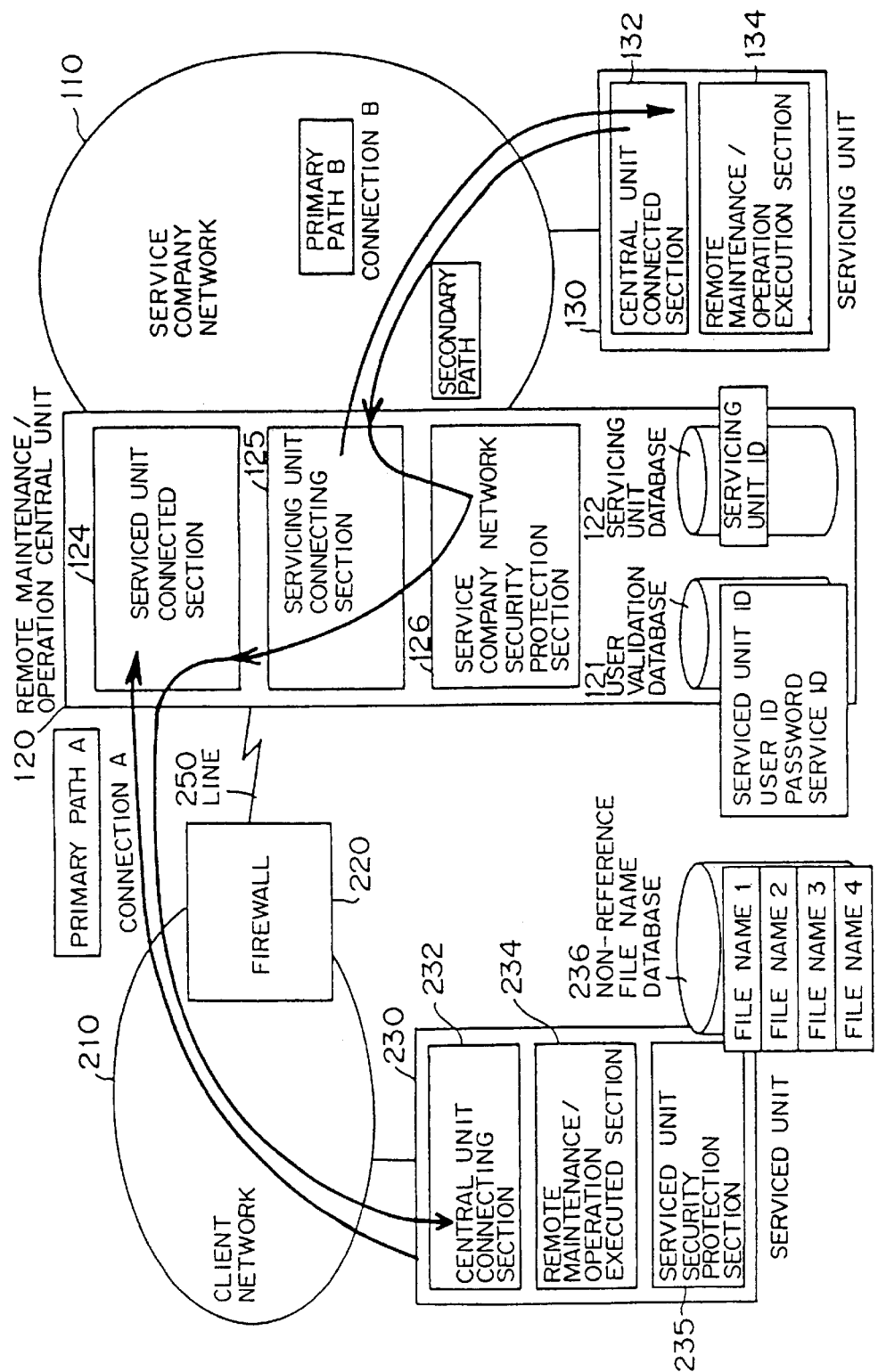
FIG. 10 shows the entire configuration of a remote maintenance and operation system according to an embodiment of the present invention.

FIG. 10 shows the entire configuration of a remote maintenance and remote operation system according to an embodiment of the present invention.

In this figure, a network 110 is an intracompany network of the A company which provides remote maintenance and remote operation service, while a network 210 is an intracompany network of the D company which is a client or user of that service.

The A company's network 110 and the D company's client network 210 are connected by a line 250 such as a public line, a commercial internet, or the like. Between the network 110 and the line 250 is installed a remote maintenance/operation central unit 120 which serves as a firewall. Also, a firewall 220 is installed between the client network 210 and the line 250.

To the service company's network 110 is connected a servicing unit 130 which provides remote maintenance and remote operation service. To the client network 210 is connected a serviced unit 230 which receives the remote maintenance and remote operation service provided by the servicing unit 130.

The remote maintenance/operation central unit 120 has a function of relaying packets (IP datagrams) from the servicing unit 130 on the service company's network 110 to the serviced unit 230 on the client network 210. The central unit 120 has a user validation feature to provide security for its associated network 110. The user validation feature is implemented by the provision of a user validation database 121.

The user validation database 121 stores four pieces of information items, i.e., serviced unit ID, user ID, password, and service ID, for each serviced unit 230.

The remote maintenance/operation central unit 120 is also equipped with a servicing unit database 122, which stores IP addresses of servicing unit 130 having service IDs which have been entered into the user validation database 121.

The remote maintenance/operation central unit 120 is further equipped with a serviced unit connected section 124, a servicing unit connecting section 125, and a service company network security section 126.

The serviced unit connected unit 124 sets up a connection A, which is a logical path, with the serviced unit 230 connected to the client network 210 via the firewall 220 by means of the TCP protocol. In this case, a setup request for the connection A is made by the serviced unit 230 on the client network 210. The serviced unit connected section 124 uses the pass A corresponding to the connection A to deliver packets bound for the serviced unit 230 produced by the servicing unit 130 to the serviced unit 230 through the firewall 220 and the client network 210.

The servicing unit connecting section 125 is responsive to a request by the serviced unit connecting section 124 to set up a connection B, which is a logical path, between the remote maintenance/operation central unit 120 and the servicing unit 130 through the service company network security section 126 by means of the TCP protocol. Note that the setup request for the connection B is made after the connection path A has been set up and the serviced unit 230 has been identified as a contract user's unit on the basis of the service ID, user ID, serviced unit ID and password contained in the data part of a packet sent from the serviced unit over the path A.

The service company network security section 126 carries out the above-mentioned user validation process of determining whether the serviced unit 230 is a contract user's unit by making a reference to the user validation database 121 as requested by the serviced unit connected section 124 and then returns the result to the serviced unit connecting section 124.

The servicing unit 130 is equipped with a central unit connecting section 132 and a remote maintenance/operation execution section 134.

The central unit connecting section 132 sets up the connection B with the servicing unit connecting section 125 in the remote maintenance/operation central unit 120 through the associated network 110 and receives a remote maintenance/operation requesting packet transmitted by the serviced unit 230 from the servicing unit connecting section 125 over the path B corresponding to the connection B. This request is delivered to the remote maintenance/operation execution section 134. A packet which stores a command to execute remote maintenance/operation requested by the remote maintenance/operation execution section 134 is sent to the servicing unit connecting section 125 in the central unit 120 over the path B.

Upon receipt of a packet containing a message requesting the start of remote maintenance/operation transmitted by the serviced unit 230 via the servicing unit connecting section 125, the remote maintenance/operation execution section 134 produces a packet bound for the serviced unit 230 which contains, in its data part, a command to perform remote maintenance/operation on the serviced unit 230 and then requests the central unit connected section 132 to send that packet to the servicing unit 130 in the remote maintenance/operation central unit 120. This packet is sent by the central unit connected section 132 to the servicing unit connected section 125 in the remote maintenance/operation central unit 120 over the connection B, then sent by the serviced unit connecting section 124 to the serviced unit 230 over the connection A. For example, the remote maintenance/operation execution section 134 performs a remote operation of locating and correcting faults in hardware and software that the service company sold to the user (client).

The serviced unit 230 is composed of a central unit connecting section 232, a remote maintenance/operation executed section 234, and a serviced unit security section 235.

The central unit connecting section 232 sets up the connection A with the serviced unit connected section 124 in the remote maintenance/operation central unit 120 through its associated firewall 220 in making a request to the servicing unit 130 under contract for remote maintenance/operation of its associated unit 230. After that, commands for remote maintenance/operation and packets containing the results of the remote maintenance/operation are transmitted between the central unit connecting section 232 and the servicing unit 130 over the secondary path comprised of the connection A and the connection B.

The remote maintenance/operation executed section 234 receives packets transmitted by the servicing unit 130 from the central unit connecting section 232, fetches a command for remote maintenance/operation from the packets, and analyzes and executes that command. The section 234 then produces a packet which contains the result of the execution of that command, i.e., the result of the execution of the remote maintenance/operation and requests the central unit connecting section 232 to transmit that packet to the servicing unit 130. The central unit connecting section 232 then sends that packet to the serviced unit connected section 124 in the remote maintenance/operation central unit 120 over the connection A.

When receiving a request by the remote maintenance/operation executed section 234, the serviced unit security protection section 235 performs a security check on a packet that the remote maintenance/operation executed section 234 receives from the servicing unit 130. That is a check is made as to whether the command stored in that packet is a proper command specified in the contract and the like. The result of that check is returned to the remote maintenance/operation executed section 234. For example, the security check is made to protect files that the client does not want for the service provider to make access to.

The serviced unit 230 is equipped with a non-reference file name database 236 as a database which, allows the serviced unit security protection section 235 to make a security check as described above.

The names of files that the client forbids the servicing unit 130 to make access to are entered into the non-reference file name database 236. When a command placed in a packet, sent from the servicing unit 130 is directed at any one of the files to be protected from unauthorized access, the security protection section 235 instructs the remote maintenance/operation execution section 134 to prohibit the execution of that command.

As a result, the remote maintenance/operation executed section 234 will execute only commands which, of commands from the servicing unit 130, ensure the user security protection.

The operation of the above-described embodiment will be described hereinafter with reference to FIG. 11.

In the embodiment, the execution of remote maintenance/operation is started as requested by the client. For example, this request is made through a GUI (Graphical User Interface) displayed on a display section of the serviced unit 230 (S11).

When this request is made, the central unit connecting section 232 sets up the connection A with the serviced unit connected section 124 in the remote maintenance/operation central unit 120 through the client network 210 and the firewall 220. Thereby, a session is established between the central unit connecting section 232 and the serviced unit connected section 124, permitting packets to be transmitted between the sections 232 and 124 over the connection A.

After that, the central unit connecting section 232 produces a packet containing the service ID, user ID, serviced unit ID and password which were assigned to the serviced unit 230 at the time of contract and then sends it to the serviced unit connected section 124 in the remote maintenance/operation central unit 120 over the connection A (S12).

Upon receipt of the packet, the serviced unit connected section 124 sends the service ID, user ID, serviced unit ID, and password placed in the packet to the service company network security protection section 126 for a request for determination of whether the packet was sent from the serviced unit connected section 124 of a contract user. The security protection section 125 checks the four pieces of information with information entered into the user validation database 121 (S13) and determines whether or not that packet was sent from the contract user (S14). If the determination is that the packet was sent from the contract user (S14, YES), then the security protection section 125 searches the servicing unit database 122 for a servicing unit 130 corresponding to the service ID using the service ID as a key and acquires the IP address of the servicing unit 130. The security protection section returns the result of the check and the. IP address of the servicing unit. 130 to the serviced unit connected section 124 (S15).

If, on the other hand, the determination in step S14 is that the packet is not from a contract user (NO), then the packet is rejected. In addition, the connection A is disconnected.

When the serviced unit connecting section 124 receives the result of the determination from the associated network security protection section 126 and hence knows that the packet received by itself was sent from the serviced unit 230 of a contract user, it sends the IP address of the servicing unit 130 connected to the service company network security protection section 126 to the servicing unit connecting section 125 to make a request for setting up the connection B with the servicing unit 130. In response to this request, the servicing unit connecting section 125 sets up the connection B with the central unit connected section 132 in the servicing unit 130 via the service company network 110 (S16).

Thereby, a session is established between the servicing unit connecting section 125 and the central unit connected section 132, permitting the sections 125 and 132 to transmit packets therebetween. The service company network security protection section 126 may directly request the servicing unit connecting section 125 to set up the connection B.

The servicing unit connecting section 125 notifies the central unit connected section 132 in the servicing unit 130 via the connection B that packet communications with the serviced unit 230 was made possible (S17).

The central unit connecting section 232 then requests the remote maintenance/operation execution section 134 to start the execution of remote maintenance/operation on the serviced unit 230. In response to this request, the execution section 134 starts providing remote maintenance/operation services specified at the time of a contract. The remote operation is performed by transmitting a packet containing a command for remote maintenance/operation to the contract serviced unit 230. That is, the remote maintenance/operation execution section 134 produces that packet and requests the central unit connected section 132 to transmit it to the serviced unit 230 (S18).

The central unit connected section 132 then transmits that packet for remote maintenance/operation execution to the servicing unit connecting section 125 in the remote maintenance/operation central unit 120 over the connection B (S19).

Upon receipt of that packet, the servicing unit connecting section 125 sends it to the central unit connecting section 232 in the serviced unit 230 over the connection A (S20).

Upon receipt of that packet, the central unit connecting section 232 requests the serviced unit security protection section 235 to check it for validity. Upon receipt of the result that the command contained in that packet is valid from the security protection section 235, the central unit connecting section 232 requests the remote maintenance/operation executed section 234 to execute that command. Then, the section 234 executes the command, produces a packet which contains the result of the execution, and requests the central unit connecting section 232 to send that packet to the servicing unit 130. The connecting section 232 sends the packet received to the serviced unit connected section 124 in the remote maintenance/operation central unit 120 over the connection A (S21).

If, in this case, it is determined by the serviced unit security protection section 235 that the command specified by the servicing unit 130 is a command to make access to a file entered into the non-reference file name database 236, then the remote maintenance/operation execution section 234 will not execute that command (S22).

The serviced unit connected section 124 receives a packet containing the results of the remote maintenance/operation execution and then sends it to the central unit connected section 132 in the servicing unit 130 over the connection B (S23).

Upon receipt of that packet, the connected section 132 fetches the results of the remote maintenance/operation execution from it and then sends them to the remote maintenance/operation execution section 134, which displays the execution results on the display section of the servicing unit 130 (S24).

The processes in steps 18 through 24 are repeated while the execution of remote maintenance/operation is directed in the serviced unit 230. Note that the remote maintenance/operation execution is directed through a GUI (Graphical User Interface) displayed on the display section of the servicing unit 130.

When the execution of all remote maintenance/operation services for the serviced unit 230 terminates, it is notified to the central unit connected section 132 by the remote maintenance/operation execution section 134 (S25).

The central unit connected section 132 then disconnects the connection B (S26).

After the connection B has been disconnected, the servicing unit connecting section 125 in the remote maintenance/operation central unit 120 produces a packet to assign a new password to the serviced unit 230 and then sends it to the central unit connecting section 232 in the serviced unit 230 over the connection A. When the serviced unit 230 acknowledges receipt of the new password, the serviced unit connected section 124 in the remote maintenance/operation central unit 120 disconnects the connection A (S27).

After the disconnection of the connection A, the serviced unit 230 stores that new password in a predetermined memory for use with the next remote maintenance/operation (S28).

Next, the flow of packets at the time of remote maintenance/operation execution will be described in detail.

Figure 12:
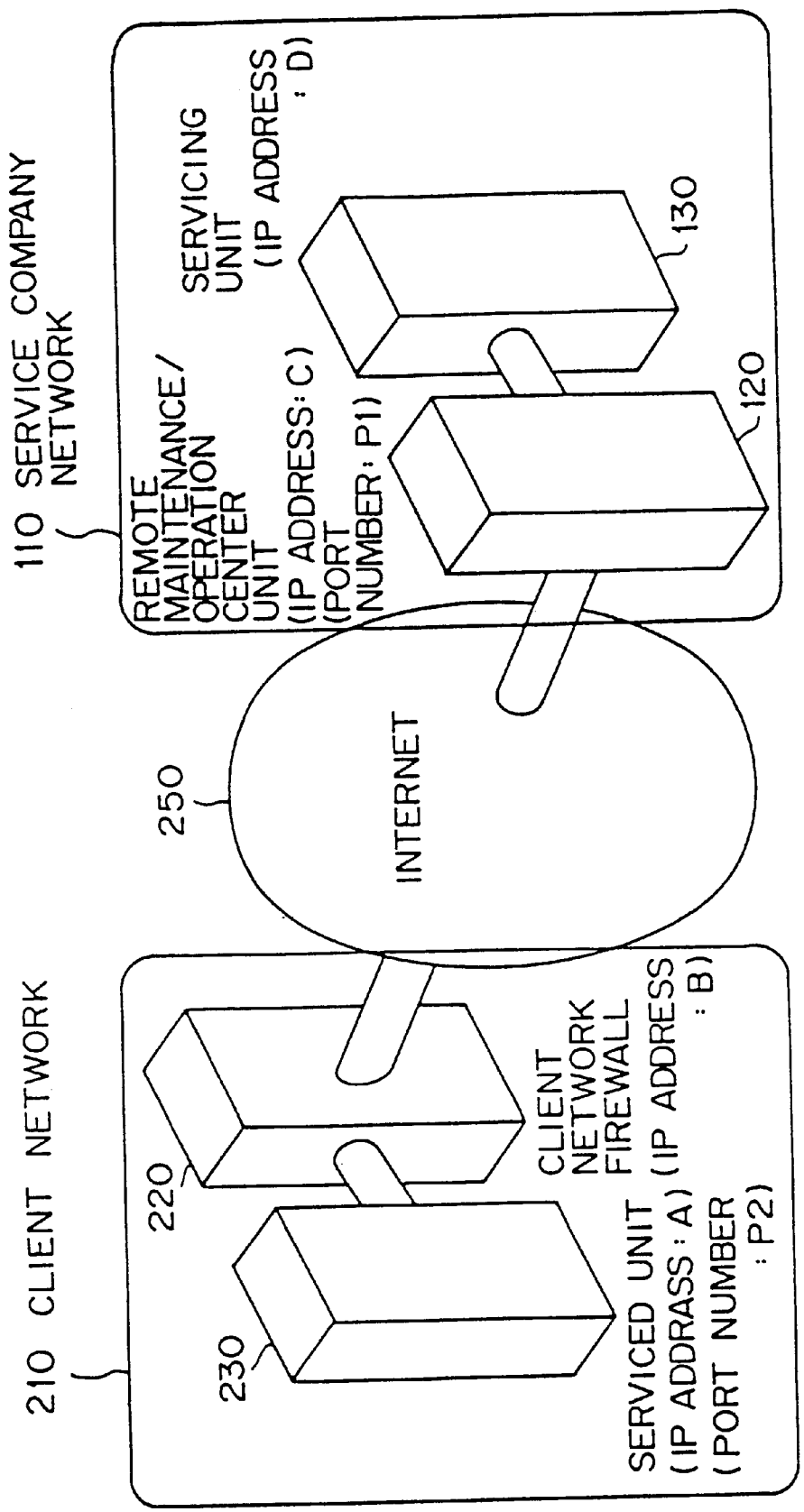
FIG. 12 shows an exemplary system configuration of the embodiment of FIG. 10.

Suppose here that, as shown in FIG. 12, the service company network 110 and the client network 210 are connected by the Internet 250, and the remote maintenance/operation central unit 120 and the servicing unit 130 in the service company network 110 and the firewall 220 and the serviced unit 230 in the client network 210 are assigned IP addresses and port numbers as shown.

That is, in the service company network 110, the remote maintenance/operation central unit 120 has its IP address set to "C", the serviced unit connected section 124 in the central unit has its port number set to "P1", and the servicing unit 130 has its IP address set to "D".

In the client network 210, on the other hand, the serviced unit 230 has its IP address set to "A", the central unit connecting section 232 in the serviced unit has its port number set to "P2", and the firewall 220 has its IP address set to "B".

Figure 13:
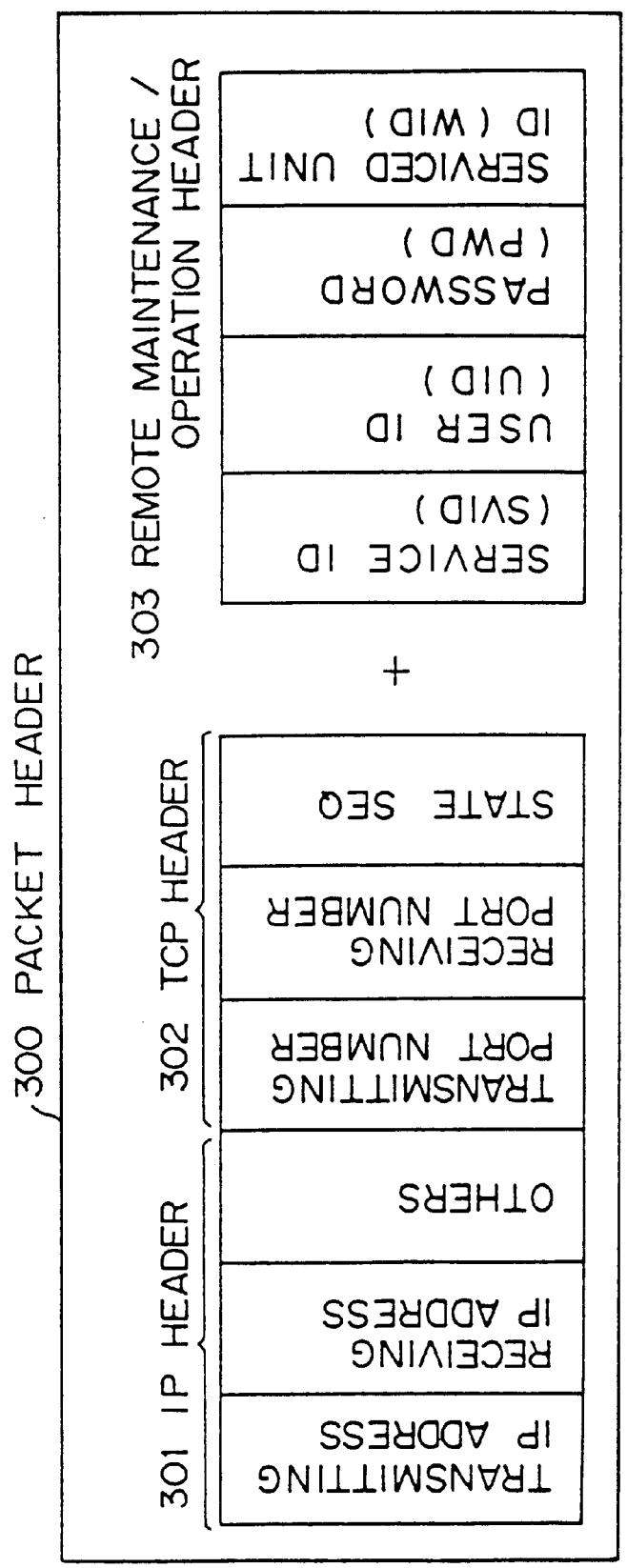
FIG. 13 shows a configuration of the header of an IP datagram in a packet communicated between the service company network and the client company network in the system of FIG. 12.

FIG. 13 shows the configuration of a header 300 set up on an IP datagram in a packet transmitted between the service company network 110 and the client network 210.

The header 300 is composed of an IP header 301, a TCP header 302, and a remote maintenance/operation header 303. The IP header 301 contains various pieces of information determined by the IP protocol, such as a transmitting IP address (source address), a receiving IP address (destination address), etc. The TCP header 302 contains various pieces of information determined by the TCP protocol, such as a transmitting port number (source port number), a receiving port number (destination port number), an SEQ (sequence number), etc.

The remote maintenance/operation header 303, which constitutes a feature of the present embodiment, contains a service ID (SVID), user ID (UID), password (PWD), and serviced unit ID (WID) which, as described previously, are used for security check to determine whether or not packets received by the serviced unit connected section 124 over the connection A have been sent from a contract user. The remote maintenance/operation header 303 is placed in the data part of the TCP header 302.

Figure 11A:
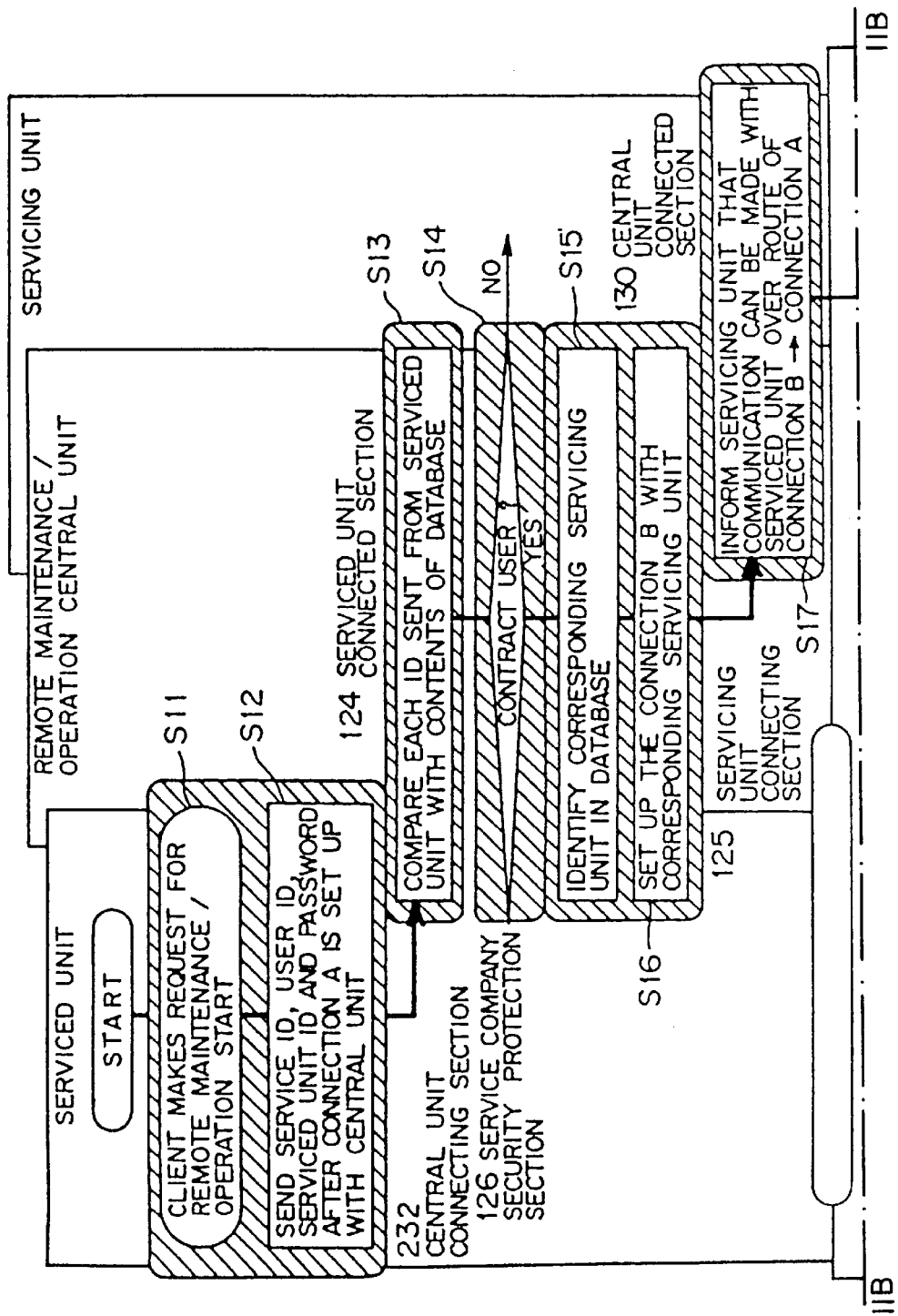
FIGS. 11A and 11B is a diagram for use in explanation of the overall operation of the system of FIG. 10.
Figure 11B:
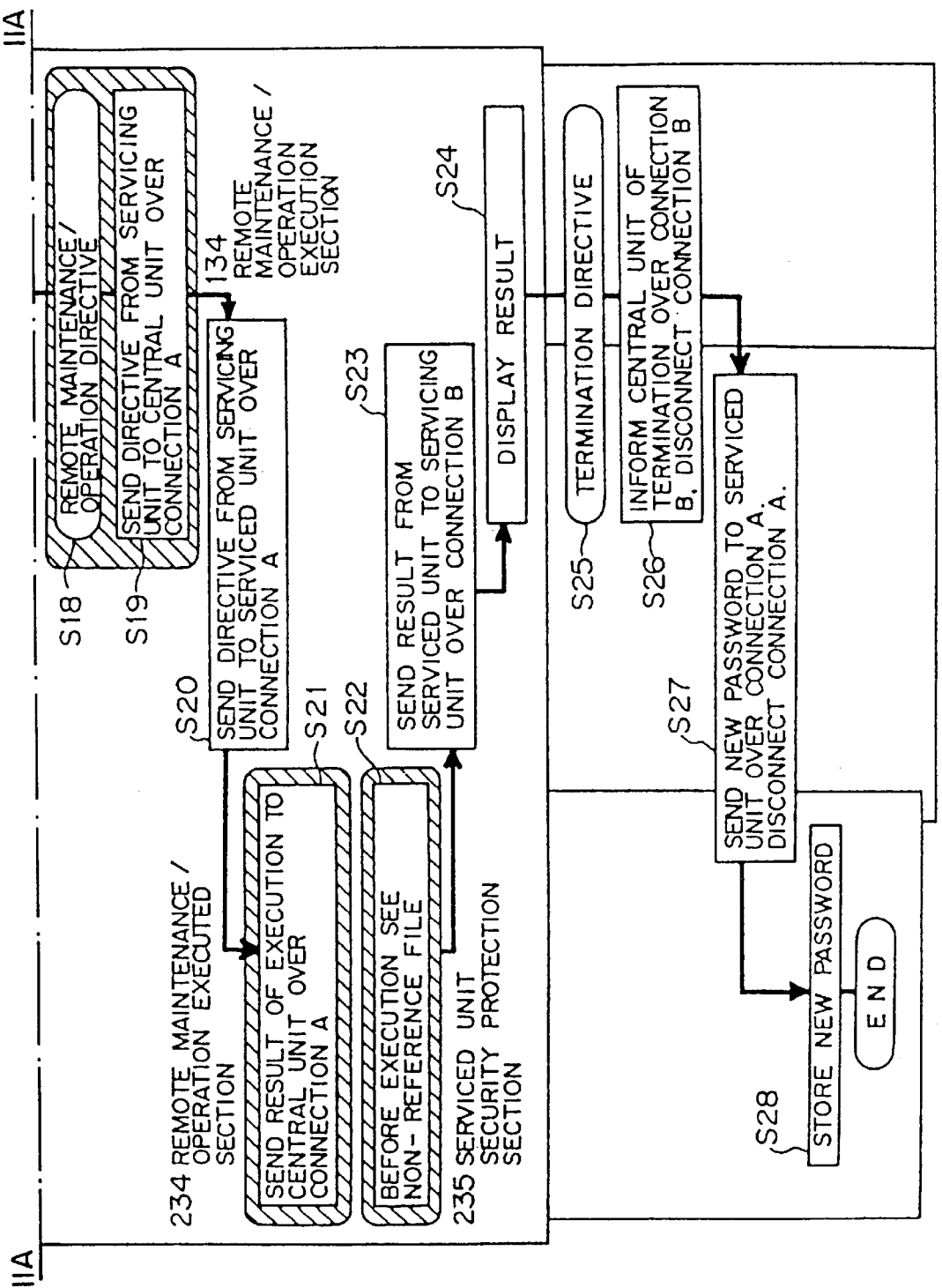
Figure 14:
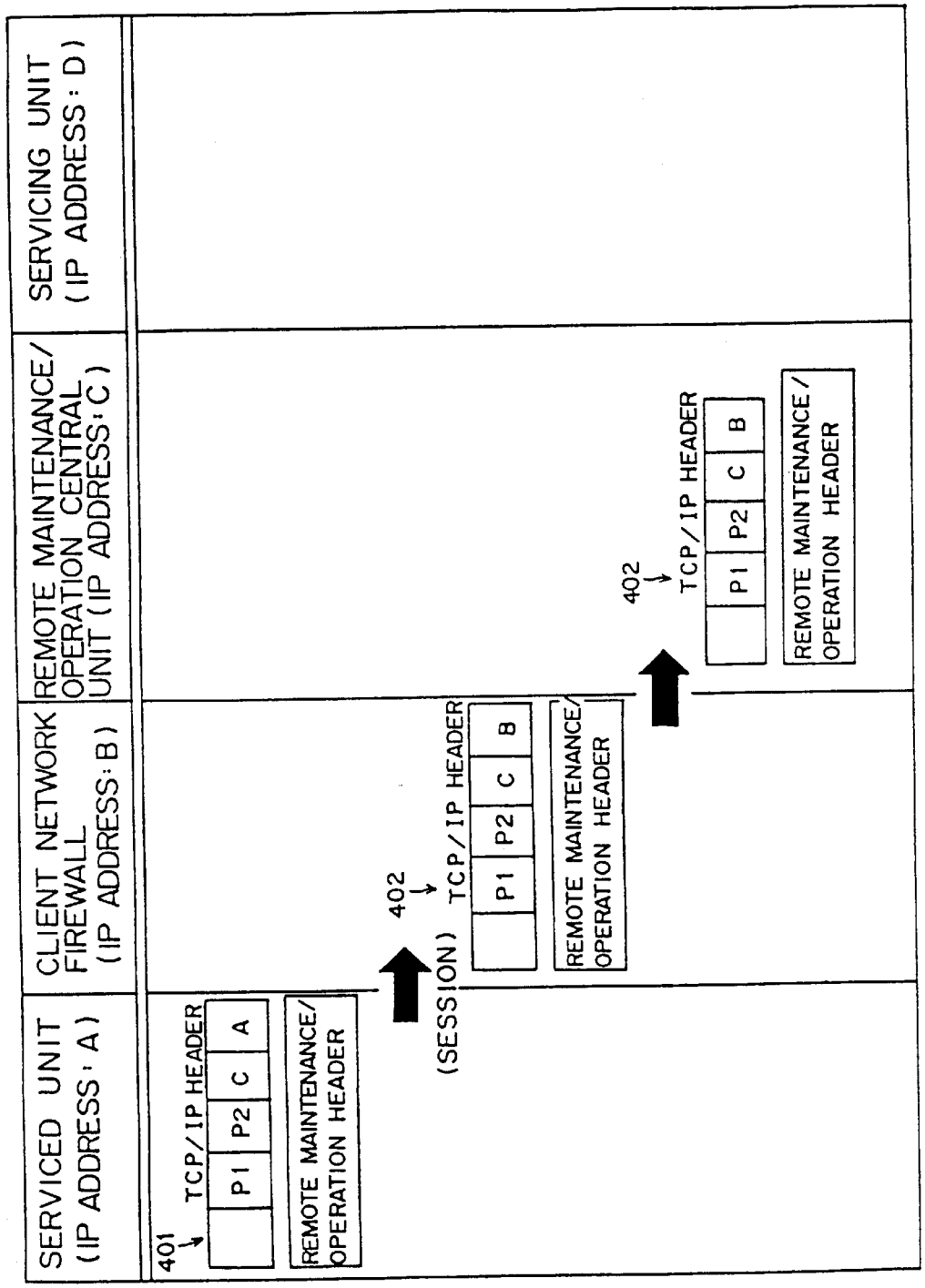
FIG. 14 is a first diagram illustrating the contents of a packet communicated between the servicing unit and the client's serviced device when the servicing device performs remote maintenance/operation on the serviced unit in the system of FIG. 12.
Figure 15B:
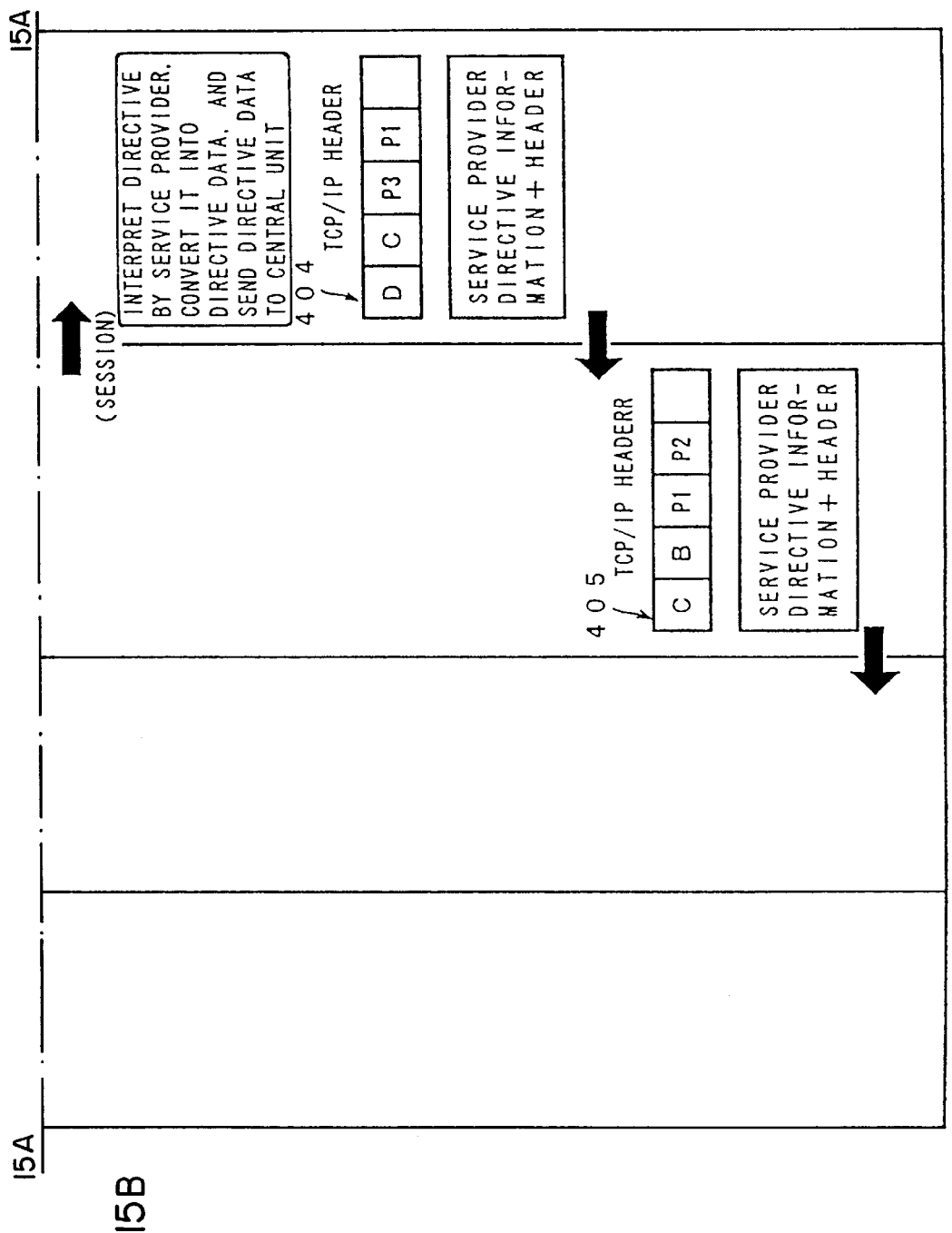
Figure 16A:
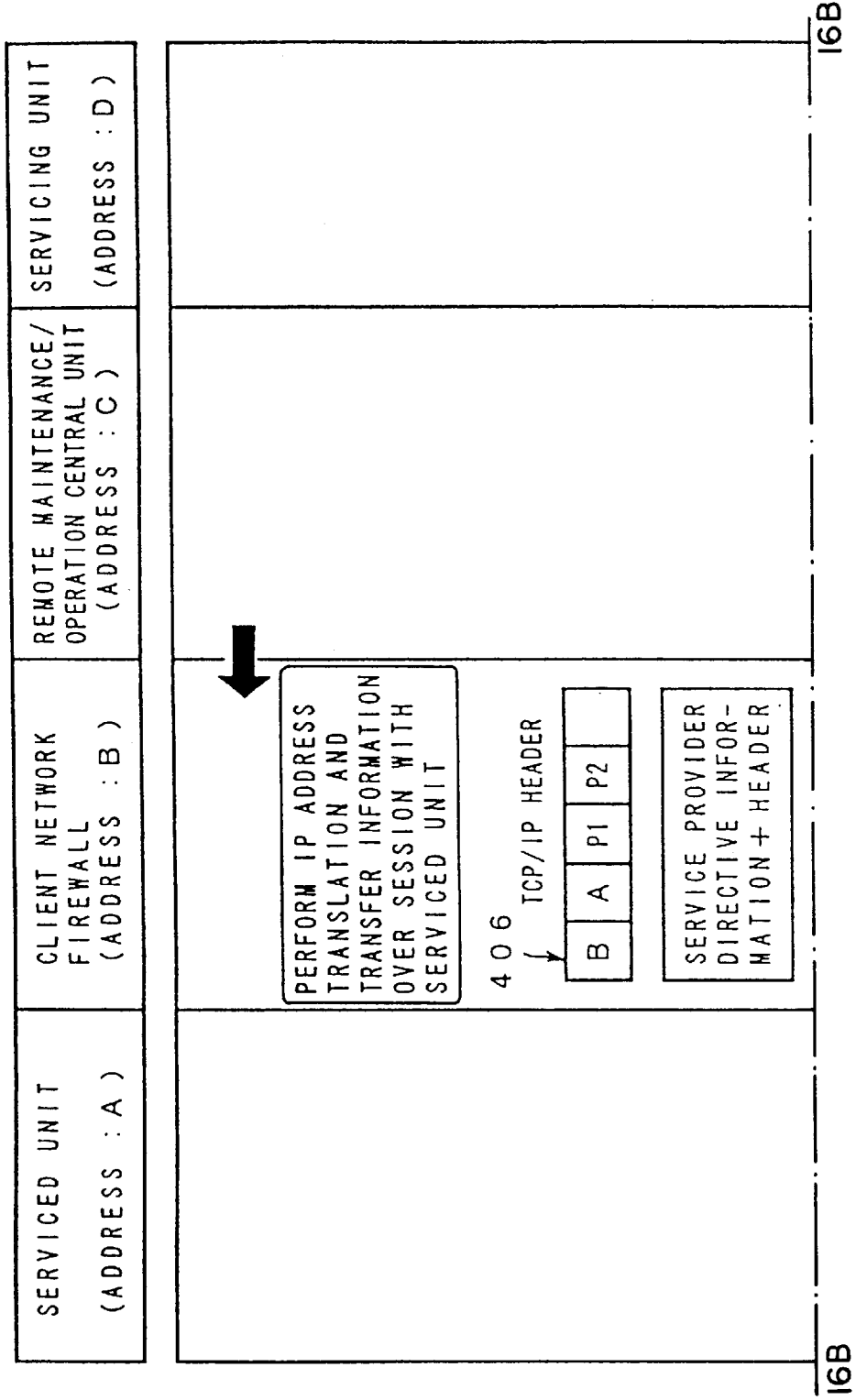

FIGS. 14, 15 and 16 are diagrams for use in explanation of the flow of packets described in conjunction with the flowchart of FIG. 11 and the packet contents.

Figure 17:
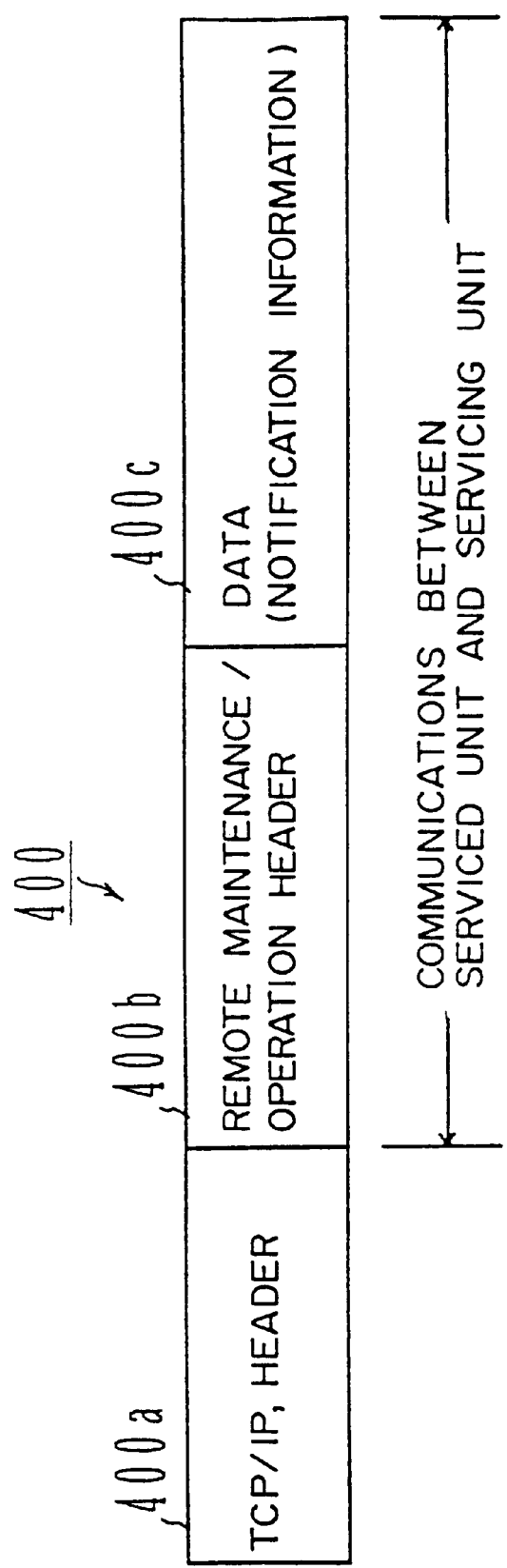
FIG. 17 shows the format of a packet transferred between the servicing unit and the serviced unit during the operation shown in FIGS. 14, 15 and 16.

Before describing the flow of packets and the packet contents, reference will first be made to FIG. 17 to describe the format of a packet 400 transmitted between the serviced unit 230 and the servicing unit 130. This packet begins with a TCP/IP header 400a as in a usual IP datagram, followed by a remote maintenance/operation header 400b used for remote maintenance/operation between the serviced unit 230 and the servicing unit 130 and communications data 400c. The TCP/IP header 400a consists of the IP header 301 and the TCP header 302 shown in FIG. 13. The contents of the remote maintenance/operation header 400b are the same as those of the header 303 of FIG. 13.

Figures 18A, 18B:
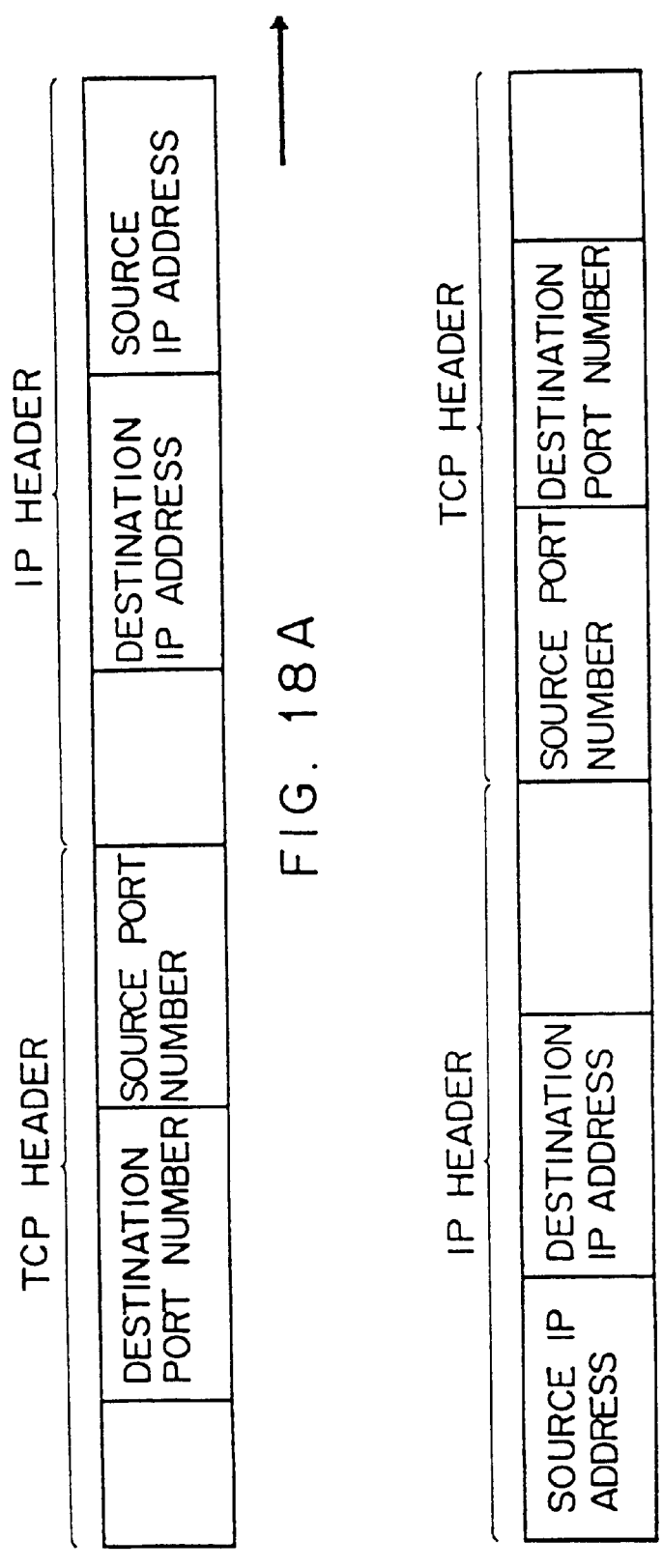
FIGS. 18A and 18B are diagrams for use in explanation of the formats of the respective packets shown in FIGS. 14 and 16.

Of packets 401 to 406 shown in FIGS. 14, 15 and 16, packets 401, 402 and 403 sent from the serviced unit 230 to the servicing unit 130 each have a TCP/IP header formatted as shown in FIG. 18A. Packets 404, 405 and 406 sent from the servicing unit 130 to the serviced unit 230 each have a TCP/IP header formatted as shown in FIG. 18B.

With packet (IP datagram) communications between the serviced unit 230 and the servicing unit 130 shown in FIGS. 14, 15 and 16, the connection (session) A set up between the serviced unit 230 and the remote maintenance/operation central unit 120 and the connection (session) B set up between the remote maintenance/operation central unit 120 and the servicing unit 130 are employed.

After the connection A has been set up, the central unit connecting section 232 in the serviced unit 230 associated with the client network 210 transmits to the firewall 220 a packet (IP datagram) 401 containing a remote maintenance/operation header in the data part of the TCP header shown in FIG. 18. The firewall 220 receives that packet over the client network 210 and then changes the transmitting IP address in the IP header from the IP address, "A", of the serviced unit 230 to its IP address "B". The resulting packet (IP datagram) 404 is then transmitted to the serviced unit connected section 124 in the remote maintenance/operation central unit 120 associated with the service company network 110 over line 250.

The above packet communications are made by using the connection (session) A. In this case, the service company network 110 will not know the IP address A of the serviced unit 230 because the transmitting IP address of the packet 402 that the remote maintenance/operation central unit 120 associated with the service company network 110 receives is set to the IP address B of the firewall 220 associated with the client network 210.

Upon receipt of the packet 402, the remote maintenance/operation central unit 120 examines the remote maintenance/operation header of the packet 402 while maintaining the session A with the firewall 220 on the client network 210 side. That is, the service company network security protection section 126 examines whether or not the service ID, user ID, password, and serviced unit ID which are placed in the remote maintenance/operation header have been entered into the user validation database 121. If the entry is confirmed, then the IP address ("D" in this case) of the servicing unit 130 having that service ID is fetched from the servicing unit database 122. The servicing unit connecting section 125 receives this IP address D from the security protection section 126 and then sets up the connection (session) B with the central unit connected section 132 in the servicing unit 130.

After that, the central unit connected section 132 produces a packet (IP datagram) 403 shown in FIG. 15. That is, the receiving IP address in the packet 403 is set to "D" and the transmitting IP address is set to its IP address "C". The receiving port number in the packet 403 is set to a port number (P3 in this case) assigned to the central unit connected section 132 in the servicing unit 130. Notification information from the user for a session request is placed in the data part of the TCP header. The servicing unit connecting section 125 then sends the packet 403 to the central unit connected section 132 in the servicing unit 130 via the associated network 110.

In the servicing unit 130, when the central unit connected section 132 receives the packet 403, the remote maintenance/operation execution section 134 interprets directive data from the user (service provider) placed in the data part of the packet 403.

The execution section 134 then produces a command (directive information to the service provider) to execute the maintenance/operation indicated by the directive data and a packet (IP datagram) 404 in which that command is placed in the data part. In this case, the receiving IP address of the packet 404 is set to the IP address "C" of the remote maintenance/operation central unit 120 and the transmitting IP address is set to the IP address "C" of the servicing unit 130. Further, the receiving port number is set to the port number P1 of the servicing unit connecting section 125 in the central unit 120 and the transmitting port number is set to the port number P3 of the central unit connected section 132. The central unit connected section 132 sends the packet 404 to the servicing unit connecting section 125 in the central unit 120 over the connection B.

Upon receipt of the packet 404 from the servicing unit connecting section 125, the serviced unit connected section 124 in the central unit 120 produces a packet (IP datagram) 405 shown in FIG. 15. The servicing unit connecting section 125 converts the receiving IP address, transmitting IP address., and receiving port number in the packet 404. That is, the receiving IP address in the packet 405 is set to the IP address B of the firewall 220 associated with the client network 210 and the transmitting IP address is set to the IP address C of the central unit 120.

Further, the receiving port number is set to the port number P2 of the central unit connecting section 232 in the serviced unit 230 on the client network 210. The serviced unit connecting section 124 transmits the packet 405 to the firewall 220 on the client network 210 over the connection A. Upon receipt of the packet 405, the firewall 220 first performs an IP address translation process and then produces a packet (IP datagram) 406 shown in FIG. 16. That is, the receiving IP address is translated from B to A, the IP address of the serviced unit 230, and the transmitting IP address is translated from C to B, the IP address of the firewall itself. The firewall 220 transmits the packet 406 to the central unit connecting section 232 in the serviced unit 230 using the session with the serviced unit 230.

In this way, the serviced unit 230 receives only packets in which the transmitting IP address is the IP address of the firewall. Therefore, the serviced unit will not know the IP address of the servicing unit 130.

The central unit connecting section 232 receives the packet 406 and then sends it to the remote maintenance/ operation executed section 234. The executed section 234 fetches directive information of the service provider from the packet 406, analyzes it, and carries out maintenance/ operation indicated by it. The directive information is checked for validity by the serviced unit security protection section 235 before the maintenance/operation is carried out. The remote maintenance/operation execution section 234 carries out only directive information that has been validated.

After the termination of the execution of the remote maintenance/operation, the remote maintenance/operation execution section 234 produces a packet (IP datagram) which contains the result of the execution in the data part of the TCP header. This packet is sent to the servicing unit 130 connected to the service company network 110 over the secondary path (refer to FIG. 10) connected by the connection A and the connection B described previously.

Next, the operation of the remote maintenance/operation central unit 120 to set up the connection (session) A with the serviced unit 230 connected to the client network 210 via the fire wall 220 installed in the client network 210 will be described in more detail.

FIG. 19 is an operating flowchart illustrating the process of relaying packets (IP datagrams) between the serviced unit 230 and the servicing unit 130 by the remote maintenance/ operation central unit 120.

Note here that the firewall 220 on the client network 210 is equipped with, for example, the TCP port filtering feature. When a contract for remote maintenance/operation service is concluded, the service providing company informs the contract user of the port number assigned to the serviced unit connected section 124 in the remote maintenance/operation central unit 120. Then, a firewall 220 administrator of the service receiving company sets the TCP port filtering of the firewall 220 so that packets can be transmitted between the serviced unit 230 on the service receiving company network 210 and the serviced unit connected section 124 through that firewall 220. The port number of the serviced unit connected section 124 may be fixed or may vary with the serviced units.

When the firewall 220 on the client network is equipped with the IP address filtering feature, the service provider informs the contract user of the IP address of the remote maintenance/operation central unit 120 and then requests the user to set the IP address filtering so that packets transmitted from the remote maintenance/operation central unit 120 toward the serviced unit 230 can pass through the firewall 220.

The serviced unit connected section 124 is always placed in the wait state for a request for session (connection) setup by the serviced unit 230 (S41).

Upon receipt of a packet containing a session setup requesting message from the serviced unit 230 via the firewall 220, the serviced unit connected section 124 requests the service company network security protection section 126 to make a check as to whether or not the service ID, user ID, password and serviced unit ID which are placed in the remote maintenance/operation header of that packet have been entered into the user validation database 121 (S42).

After that, the serviced unit connected section 124 receives the result from the security protection section 126 to determine whether or not the serviced unit 230 belongs to a contract user (S43).

Next, if the determination is that the session setup requesting message is not from a contract user (S43, NG), then the serviced unit connected section 124 rejects the request for session setup (S44).

If, on the other hand, the determination is that the session setup requesting packet is from a contract user (S43, OK), then the serviced unit connected section 124 sends the service ID contained in that packet to the servicing unit connecting section 125. Upon receipt of that service ID, the servicing unit connecting section 125 retrieves the IP address of the servicing unit 130 corresponding to the service ID from the servicing unit database 122 (S45).

And, the servicing unit connecting section 125 sets up the session (connection) B with the servicing unit 130 having the IP address via the service company network 110 using this IP address.

Then, the servicing unit connecting section 125 generates a child process for the serviced unit 230 while maintaining the sessions (connections) with the serviced unit 230 and the servicing unit 130 (S47).

Next, the servicing unit connecting section 125 makes a system call to wait for a session request by another serviced unit 230 (S48). The procedure then returns to step S41.

The above-described steps S41 to S48 allows the remote maintenance/operation central unit 120 to set up multiple sessions between the serviced unit 230 and the servicing unit 130. That is, the servicing unit 130 can provide remote maintenance/operation service to multiple serviced units 230.

In FIG. 19, there are illustrated child processes generated by sessions set up between the servicing unit 130 and a serviced unit A, between the servicing unit 130 and a serviced unit B, and between the servicing unit 130 and a serviced unit C. Each child process is equipped with a buffer 127 (127A, 127B, 127C) for the corresponding serviced unit 230 and a buffer 128 (128A, 128B, 128C) for the servicing unit 13. When a packet is transmitted from a serviced unit 230 to the servicing unit 130, it is stored temporarily in the corresponding buffer 127 and then copied into the buffer 128 for the servicing unit 130. The packet stored in the buffer 128 is taken out by the servicing unit connecting section 125, then output to the servicing unit 130.

Though not shown in FIG. 19, where a packet is sent from the servicing unit 130 to a serviced unit 230, it is temporarily stored in the buffer 128 for the servicing unit 130, then copied into the corresponding buffer 127 for the serviced unit 230. The packet is taken out from the buffer 127 by the serviced unit connected section 124, then output to the serviced unit 230.

In the manner described above, packets are transmitted between the serviced unit 230 and the servicing unit 130 via the remote maintenance/operation central unit 120 by the use of the two connections—the connection A and the connection B—and remote maintenance/operation is performed on the serviced unit 230 by the servicing unit 130.

Figure 20A:
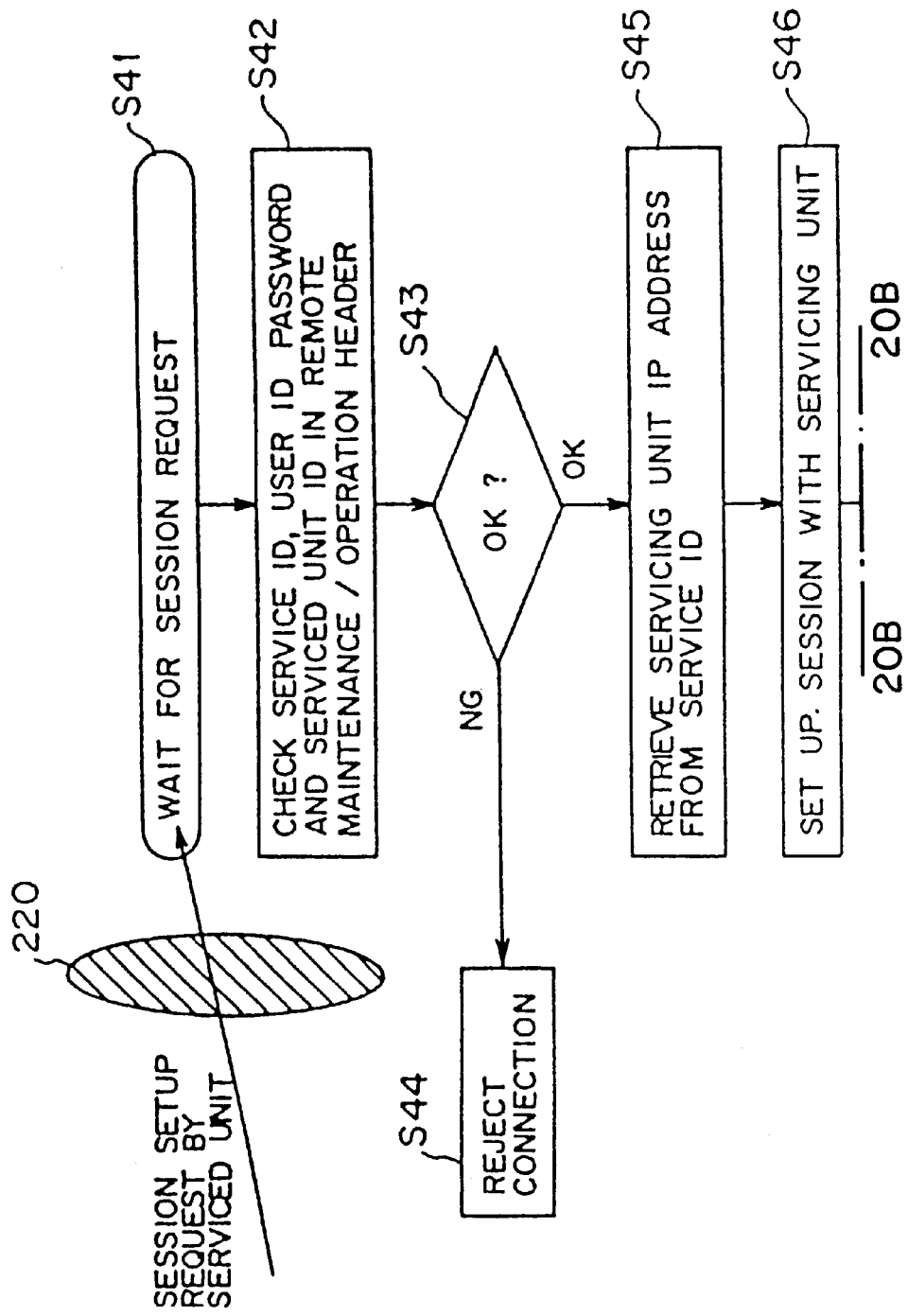

FIG. 20 is an operating flowchart illustrating the IP relay feature of the remote 125 maintenance/operation central unit 120 from a different point of view.

In this figure, based on steps S41 to S46, which are identical to the corresponding steps in FIG. 19, the servicing unit connecting section 125 sets up a session (connection B) with the servicing unit 130 through the service company network 110 in accordance with a session setup request by the serviced unit 230.

The servicing unit connecting section 125 then creates a session management table (S51). This table contains three types of information items—session number, serviced unit session ID, and servicing unit session ID. The serviced unit session ID is related to a session that is set up by the connection A established between the serviced unit 230 and the serviced unit connected section 124. The servicing unit session ID is related to a session that is set up by the connection B established between the servicing unit connecting section 125 and the servicing unit 130. By the serviced unit session ID and the servicing unit session ID, information about a logical path established between the serviced unit 230 and the servicing unit 130 is obtained, which allows the remote maintenance/operation central unit 120 to carry out a process of relaying packets (IP datagrams) between the serviced unit 230 and the servicing unit 130. The session ID, which is managed on the TCP protocol layer by the servicing unit connecting section 125, is used to identify each session (connection) distinguished by information such as transmitting IP address, receiving IP address, transmitting port number, receiving port number and the like. In the session management table, each session between the serviced unit 230 and the servicing unit 130 that is determined by a set of serviced unit and servicing unit session IDs is assigned a unique session number.

The remote maintenance/operation central unit 120 (the serviced unit connected section 124 or servicing unit connecting section 125) waits for entry of packets from each unit (the serviced unit 230 or the servicing unit 130) (S52).

Upon receipt of a packet from a unit, the remote maintenance/operation central unit 120 (serviced unit 124 or servicing unit connecting section 125) searches the session management table by the ID (session ID) of a session over which that packet has been transmitted and fetches the session ID of a unit (serviced unit 230 or servicing unit 130) corresponding to that session ID from the session management table (S54). That is, when the serviced unit connected section 124 receives a packet from the serviced unit 230, it fetches the servicing unit session ID corresponding to the session (serviced unit session ID) over which that packet has been transmitted. On the other hand, when the servicing unit connecting section 125 receives a packet from the servicing unit 130, it fetches the serviced unit session ID corresponding to the session (servicing unit session ID) over which that packet has been transmitted.

The servicing unit connecting section 125 sends the packet from the serviced unit 230 to the servicing unit 130 according to the session ID fetched. Also, the serviced unit connected section 124 sends the packet from the servicing unit 130 to the serviced unit 230 according to the session ID fetched (S55).

According to the present embodiment, as described above, in a system in which an internal network of a remote maintenance/operation service providing company and an internal network of a client company having a service receiving unit are interconnected by an external network such as an internet, public line or the like and each of the companies is equipped with a firewall for the external network, the service providing company can use a servicing unit connected to its internal network to perform remote maintenance/operation on the serviced unit connected to the client internal network. And moreover, both the companies are equipped with a security protection feature and hence can provide security for their respective internal networks.

In the present embodiment, a commercial internet can be used as the external network. In this case, dialup IP connection users can become clients. In addition, users who use dialup IP connection terminals each assigned an IP address at the time of line connection to the commercial internet can also become clients. The reason is that, in the present embodiment, whether received packets have been sent from a contract user or not is determined on the basis of the service ID, user ID, serviced unit ID and password which are entered at the time a contract is concluded and thus contract user validation can be made possible without depending on only IP addresses.

Although, in the above embodiment, the TCP/IP protocol is used to, transmit packets for remote maintenance/operation, this is not restrictive and any other protocol may be used. Moreover, the intracompany networks of a contract user company and a service providing company need not necessarily be interconnected by the Internet and may be interconnected by any network that is provided by a common carrier. Furthermore, the present invention is applicable not only to remote maintenance/operation but also to remote operation in general.

According to the present invention, a remote operation service receiving client and a remote operation service providing company can perform remote operation by the use of units connected to their respective intracompany networks with their respective firewalls installed in an external network. Therefore, existing intracompany networks can be used as they are to implement a safe, inexpensive remote operation service system.

A serviced unit is equipped with a security check feature which prevents the execution of remote operations other than those specified in a contract, thus ensuring security. Also, a service providing company is equipped with a security check feature which, after a connection has been set up with the serviced unit of a contract user, checks packets sent over the connection for the presence of user validation information indicating a contract user, thus protecting the servicing unit from unfair access.

What is claimed is:

1. A remote operation service system in which first and second internal networks are connected to an external network by first and second firewalls which are respectively installed in said first and second networks, and a servicing unit connected to said second internal network provides remote operation services to a serviced unit connected to said first internal network, said serviced unit including:
means for setting up a first connection with said second firewall installed for said second internal network via said first internal network and said first firewall installed for said first internal network; and
means for transmitting packets containing data for a remote operation to or from said servicing unit over said first connection, said second firewall including:
means for, after checking whether or not the received packets being the packets transmitted from the said serviced unit belonging to a contract user, and after said first connection has been set up with said serviced unit, setting up a second connection with said servicing unit via said second internal network; and
means for relaying packets between said serviced unit and said servicing unit using said first and second connections, and said servicing unit including:
means for providing remote operation services to said serviced unit by transmitting packets to or from said serviced unit via said second firewall and said second connection.

2. The system according to claim 1, wherein said serviced unit includes validation means for, when receiving a packet from said second firewall, which said packet transmitted from said servicing unit over said first connection, checking a command for remote operation in said packet for its validity.

3. A remote operation service system in which first and second internal networks are connected to the Internet by first and second firewalls which are respectively installed in said first and second networks, and a servicing unit connected to said second internal network provides remote operation services to a serviced unit connected to said first internal network, said serviced unit including:
means for setting up a first connection with said second firewall installed for said second internal network via said first internal network and said first firewall installed for said first internal network; and
means for transmitting packets containing data for a remote operation to or from said servicing unit over said first connection, said second firewall including:
means for, after checking whether or not the received packets being the packets transmitted from the said serviced unit belonging to a contract user, and after said first connection has been set up with said serviced unit, setting up a second connection with said servicing unit via said second internal network; and
means for relaying the received packets between said serviced unit and said servicing unit using said first and second connections if the received packets belonged to the contract user, and said servicing unit including:
means for providing remote operation services to said serviced unit by transmitting packets to or from said serviced unit via said second firewall and said second connection.

4. The system according to claim 3, wherein said serviced unit includes validation means for, when receiving a packet from said second firewall, which said packet transmitted from said servicing unit over said first connection, checking a command for remote operation in said packet for its validity.

5. A remote operation service providing method in a remote operation service system in which first and second internal networks are connected to an external network by first and second firewalls which are respectively installed in said first and second networks and a servicing unit connected to said second internal network provides remote operation services to a serviced unit connected to said first internal network, said remote operation service providing method comprising the steps of:

in said serviced unit, setting up a first connection with said second firewall installed for said second internal network via said first internal network and said first firewall for said first internal network;
in said serviced unit, transmitting packets containing data for performing a remote operation to or from said servicing unit connected to said second internal network over said first connection;
in said second firewall, setting up a second connection with said servicing unit via said second internal network, after checking whether or not the received packets being the packets transmitted from the said serviced unit belonging to a contract user, and after said first connection has been set up with said serviced unit;

in said second firewall, relaying packets between said serviced unit and said servicing unit by transmitting packets to or from said serviced unit via said second firewall and said second connection.

6. A remote operation method for use with a unit to be serviced which is connected to a second internal network in which a second firewall is installed for an external network and receives a remote operation service from a servicing unit connected to a first internal network in which a first firewall is installed for the external network, comprising:

establishing by the unit to be serviced a connection to the first firewall through the second firewall;

transmitting by the unit to be serviced a packet to and from the first firewall through the connection;

determining by the first firewall whether the unit to be serviced belongs to the contract user based upon contents of the received packet, and forwarding to the servicing unit only received packets sent from a contract user;

checking, by the unit to be serviced, security of remote operation directive information stored in a received packet;

performing, by the servicing unit, a remote operation on the unit to be serviced according to the remote operation directive information whose security is checked by the first firewall; and transmitting, by the unit to be serviced, an execution result of the remote operation to the first firewall through the connection.

7. A security check method for use with a center device functioning as a second firewall in response to access through an external network to a servicing unit by a unit to be serviced which is connected to a first internal network in which a first firewall is installed for the external network, comprising:

establishing by the center device a first connection to the unit to be serviced through the first firewall and the external network;

transmitting by the center device a packet to and from the unit to be serviced through the first connection;

checking by the center device after establishing the first connection whether received packet is transmitted from the unit to be serviced of a subscriber;

establishing by the center device a second connection to the servicing unit through an internal network when the center device determines as a result of the checking that the received packet is transmitted from the unit to be serviced of the subscriber; and transmitting by the center device the packet to and from the servicing unit connected to the internal network through the second connection, wherein only packets transmitted from the unit to be serviced of the subscriber are transmitted to the servicing unit.

* * * * *